US012595369B2

(12) United States Patent
    Fini et al.

(10) Patent No.: US 12,595,369 B2
(45) Date of Patent: Apr. 7, 2026

(54) ALGAE-RESISTANT BITUMEN-CONTAINING MATERIALS

(71) Applicants: Elham Fini, Phoenix, AZ (US);
    Farideh Pahlavan, Tempe, AZ (US);
    Albert Hung, Tempe, AZ (US)

(72) Inventors: Elham Fini, Phoenix, AZ (US);
    Farideh Pahlavan, Tempe, AZ (US);
    Albert Hung, Tempe, AZ (US)

(73) Assignee: Arizona Board of Regents on behalf of Arizona State University,
    Scottsdale, AZ (US)

( * ) Notice: Subject to any disclaimer, the term of this patent is extended or adjusted under 35 U.S.C. 154(b) by 584 days.

(21) Appl. No.: 18/085,753

(22) Filed: Dec. 21, 2022

(65) Prior Publication Data
    US 2023/0193033 A1 Jun. 22, 2023

Related U.S. Application Data

(60) Provisional application No. 63/292,680, filed on Dec. 22, 2021.

(51) Int. Cl.
    *C08L 95/00* (2006.01)

(52) U.S. Cl.
    CPC .......... *C08L 95/00* (2013.01); *C08L 2555/54* (2013.01); *C08L 2555/64* (2013.01)

(58) Field of Classification Search
    None
    See application file for complete search history.

(56) References Cited

U.S. PATENT DOCUMENTS

| | | | |
|---|---|---|---|
| 2,182,837 A | 12/1939 | Bacon |
| 2,686,166 A | 8/1954 | Taylor |
| 3,803,066 A | 4/1974 | Petrossi |
| 4,145,322 A | 3/1979 | Maldonado |
| 9,243,409 B2 | 1/2016 | Kalkanoglu |

(Continued)

FOREIGN PATENT DOCUMENTS

| | | |
|---|---|---|
| AU | 2015213412 A1 | 9/2015 |
| CN | 113145069 A | 7/2021 |

(Continued)

OTHER PUBLICATIONS

Amić, Ana, et al. "Free radical scavenging potency of quercetin catecholic colonic metabolites: Thermodynamics of 2H +/2e-processes." Food chemistry 218 (2017): 144-151.

(Continued)

*Primary Examiner* — Colin W. Slifka
(74) *Attorney, Agent, or Firm* — Fish & Richardson P.C.

(57) ABSTRACT

A modified bitumen composition includes bitumen, biomass oil including one or more phenolic compounds, and added sulfur. The modified bitumen composition includes between about 5 wt % and about 25 wt % of the added sulfur, at least some of the added sulfur is present as polysulfide chains, and at least some of the one or more phenolic compounds are configured to covalently bind to the polysulfide chains. Making a modified bitumen includes combining bitumen and elemental sulfur to yield sulfur-extended bitumen, and combining the sulfur-extended bitumen with biomass oil including one or more phenolic compounds to yield the modified bitumen.

16 Claims, 14 Drawing Sheets

(56) References Cited

U.S. PATENT DOCUMENTS

| | | |
|---|---|---|
| 2011/0294927 A1 | 12/2011 | Williams et al. |
| 2012/0090221 A1 | 4/2012 | Banasiak et al. |
| 2015/0128829 A1 | 5/2015 | Huang et al. |
| 2019/0106637 A1 | 4/2019 | Oswald et al. |
| 2019/0315662 A1 | 10/2019 | Shearer et al. |
| 2022/0204773 A1 | 6/2022 | Fini |
| 2023/0193033 A1 | 6/2023 | Fini |
| 2023/0242820 A1 | 8/2023 | Fini |
| 2023/0374310 A1 | 11/2023 | Fini |

FOREIGN PATENT DOCUMENTS

| | | | | |
|---|---|---|---|---|
| DE | 102015013981 A1 | 3/2017 | | |
| GB | 579368 A | * 8/1946 | ............ | C10C 3/023 |
| GB | 610629 A | * 10/1948 | ............ | C10C 3/023 |
| GB | 1507332 A | 4/1978 | | |
| GB | 2205104 A | * 11/1988 | ............ | C08L 95/00 |
| WO | WO 2009016381 A2 | 2/2009 | | |
| WO | 2015127561 A1 | 9/2015 | | |
| WO | WO 2019074499 A1 | 4/2019 | | |

OTHER PUBLICATIONS

Amorati, Riccardo, et al. "Effect of ortho-SR Groups on O—H Bond Strength and H-Atom Donating Ability of Phenols: A Possible Role for the Tyr-Cys Link in Galactose Oxidase Active Site?." Journal of the American Chemical Society 130.1 (2008): 237-244.

Becke, Axel D. "Density-functional thermochemistry. III. The role of exact exchange. 98 (7): 5648-5652." The Journal of Chemical Physics. doi: https://doi. org/10.1063/1.464913 (1993).

Bordwell, F. G., et al. "Assessment of the importance of changes in ground-state energies on the bond dissociation enthalpies of the OH bonds in phenols and the SH bonds in thiophenols." Journal of the American Chemical Society 116.15 (1994): 6605-6610.

Bukowski, J., et al. "An alternative asphalt binder, sulfur-extended asphalt (SEA)." No. FHWA-HIF-12-037. United States. Federal Highway Administration, 2012, pp. 1-13.

Chen, Y., et al. "Structure-thermodynamics-antioxidant activity relationships of selected natural phenolic acids and derivatives: An experimental and theoretical evaluation." PLoS One 10.3 (2015): e0121276, pp. 1-20.

Chung, W.J., et al. "The use of elemental sulfur as an alternative feedstock for polymeric materials." Nature chemistry 5.6 (2013): 518-524.

De Heer, Martine I., et al. "Hydrogen atom abstraction kinetics from intramolecularly hydrogen bonded ubiquinol-0 and other (poly) methoxy phenols." Journal of the American Chemical Society 122.10 (2000): 2355-2360.

Dizhbite, T., et al. "Characterization of the radical scavenging activity of lignins—natural antioxidants." Bioresource technology 95.3 (2004): 309-317.

D'Melo, D., et al. "Self-assembly of amorphous sulphur in bitumen-sulphur mixtures and its impact on properties." Construction and Building Materials 126 (2016): 976-982.

Fan, G., et al. "Growth inhibition of harmful cyanobacteria by nanocrystalline Cu-MOF-74: efficiency and its mechanisms." Journal of hazardous materials 367 (2019): 529-538.

Farhoosh, R., et al. "Structure—antioxidant activity relationships of o-hydroxyl, o-methoxy, and alkyl ester derivatives of p-hydroxybenzoic acid." Food chemistry 194 (2016): 128-134.

Fini, Elham H., et al. "Chemical characterization of biobinder from swine manure: Sustainable modifier for asphalt binder." Journal of Materials in Civil Engineering 23.11 (2011): 1506-1513.

Frisch, "Gaussian 16," Expanding the limits of computational chemistry, 2016, 2 pages.

Gawel, Irena. "Sulphur-modified asphalts." Developments in petroleum science. vol. 40. Elsevier, 2000. 515-535.

Gladkikh, V., et al. "Viscosity of plasticized sulfur-extended asphalt: Two-factor sequential optimization." MATEC Web of Conferences. vol. 106. EDP Sciences, 2017, pp. 1-7.

Gonzalez, C., et al. "An improved algorithm for reaction path following." The Journal of Chemical Physics 90.4 (1989): 2154-2161.

Gonzalez, C., et al. "Reaction path following in mass-weighted internal coordinates." Journal of Physical Chemistry 94.14 (1990): 5523-5527.

Hosseinnezhad, S., et al. "Physiochemical characterization of synthetic bio-oils produced from bio-mass: a sustainable source for construction bio-adhesives." RSC advances 5.92 (2015): 75519-75527.

Hung, Albert M., et al. "Effects of water exposure on bitumen surface microstructure." Construction and Building Materials 135 (2017): 682-688.

Jacobsen, Heiko. "Localized-orbital locator (LOL) profiles of chemical bonding." Canadian Journal of Chemistry 86.7 (2008): 695-702.

Jin, X., et al. "Fast-rate-constant-rate oxidation kinetics model for asphalt binders." Industrial & Engineering Chemistry Research 50.23 (2011): 13373-13379.

Jongberg, S., et al. "Phenolic antioxidant scavenging of myosin radicals generated by hypervalent myoglobin." Journal of agricultural and food chemistry 60.48 (2012): 12020-12028.

Lee, Dah-yinn. "Modification of asphalt and asphalt paving mixtures by sulfur additives." Industrial & Engineering Chemistry Product Research and Development 14.3 (1975): 171-177.

Lee, C., et al. "Development of the Colle-Salvetti correlation-energy formula into a functional of the electron density." Physical review B 37.2 (1988): 785-789.

Leopoldini, M., et al. "Structure, conformation, and electronic properties of apigenin, luteolin, and taxifolin antioxidants. A first principle theoretical study." The Journal of Physical Chemistry A 108.1 (2004): 92-96.

Leopoldini, M., et al. "The molecular basis of working mechanism of natural polyphenolic antioxidants." Food chemistry 125.2 (2011): 288-306.

Liu, Gang, et al. "α-Sulfur crystals as a visible-light-active photocatalyst." Journal of the American Chemical Society 134.22 (2012): 9070-9073.

Lucarini, M., et al. "Bond dissociation enthalpies of polyphenols: the importance of cooperative effects." The Journal of organic chemistry 67.3 (2002): 928-931.

Makowska, M., et al. "The oxidation of bitumen witnessed in-situ by infrared spectroscopy." Materials and structures 50 (2017): 1-17.

Martínez-Estrada, A., et al. "Comparative study of the effect of sulfur on the morphology and rheological properties of SB- and SBS-modified asphalt." Journal of Applied Polymer Science 6.115 (2009): 3409-3422.

Meyer, B. "Elemental sulfur." Chemical Reviews 76.3 (1976): 367-388.

Leslie R. Rudnick, "Lubricant Additives: Chemistry and Applications," (2009) Second Edition, CRC press, 796 pages.

Mousavi, M., et al. "Sustainability implications of regenerative sulfur blooms in bituminous composites." ACS Sustainable Chemistry & Engineering 9.28 (2021): 9486-9493.

Mousavi, M., et al. "Phenolic compounds to amplify the effect of sulfur on Bitumen's thermomechanical properties." Fuel 287 (2021): 119532, pp. 1-10.

Mutlu, H., et al. "Sulfur chemistry in polymer and materials science." Macromolecular rapid communications 40.1 (2019): 1800650, pp. 1-51.

Ochterski, J., et al. "A comparison of model chemistries." Journal of the American Chemical Society 117.45 (1995): 11299-11308.

Ordoudi, S. A., et al. "Structure—DPPH• scavenging activity relationships: Parallel study of catechol and guaiacol acid derivatives." Journal of agricultural and food chemistry 54.16 (2006): 5763-5768.

Papirer, E., et al. "Structural modes of sulphur in sulphur-bitumen composites as studied by electron microscopy." Fuel 59.9 (1980): 617-620.

Petersen, J. Claine. "A review of the fundamentals of asphalt oxidation: chemical, physicochemical, physical property, and durability relationships." Transportation research circular E-C140 (2009), pp. 1-78.

(56)　　　　　References Cited

OTHER PUBLICATIONS

Petrossi, U., et al. "Reactions and technological properties of sulfur-treated asphalt." Industrial & Engineering Chemistry Product Research and Development 11.2 (1972): 214-219.

Pfaendtner, J., et al. "Elucidation of structure—reactivity relationships in hindered phenols via quantum chemistry and transition state theory." Chemical engineering science 62.18-20 (2007): 5232-5239.

Reza N., et al. "Antioxidant properties of Aloe vera components: a DFT theoretical evaluation." Free radical research 53.8 (2019): 922-931.

Rodríguez-Bonilla, P., et al. "Comparative study of the antioxidant capacity of four stilbenes using ORAC, ABTS+, and FRAP techniques." Food Analytical Methods 10 (2017): 2994-3000.

Sakib, N., et al. "A review of the evolution of technologies to use sulphur as a pavement construction material." International Journal of Pavement Engineering 22.3 (2021): 392-403.

Sathe, P., et al. "Removal and regrowth inhibition of microalgae using visible light photocatalysis with ZnO nanorods: A green technology." Separation and Purification Technology 162 (2016): 61-67.

Shankar, S., et al. "Preparation of sulfur nanoparticles and their antibacterial activity and cytotoxic effect." Materials Science and Engineering: C 92 (2018): 508-517.

Singh, N., et al. "Mechanistic aspects of hydrogen abstraction for phenolic antioxidants. Electronic structure and topological electron density analysis." Physical Chemistry Chemical Physics 7.4 (2005): 614-619.

Siquet, C., et al. "Antioxidant profile of dihydroxy- and trihydroxyphenolic acids—A structure-activity relationship study." Free radical research 40.4 (2006): 433-442.

Strickland, D., et al. "Study of the low-temperature properties of sulphur extended asphalt mixtures." Proceedings of the fifty-third annual conference of the Canadian technical asphalt association (CTAA) Canadian technical asphalt association. 2008, 2 pages.

Syroezhko, A. M., et al. "Modification of paving asphalts with sulfur." Russian journal of applied chemistry 76 (2003): 491-496.

Tejero, I., et al. "Tunneling in green tea: Understanding the antioxidant activity of catechol-containing compounds. A variational transition-state theory study." Journal of the American Chemical Society 129.18 (2007): 5846-5854.

Tobolsky, A.V., et al. "Equilibrium polymerization of sulfur." Journal of the American Chemical Society 81.4 (1959): 780-782.

Vaquero, MJ Rodríguez, et al. "Antibacterial effect of phenolic compounds from different wines." Food control 18.2 (2007): 93-101.

Veselinović, J. B., et al. "Antioxidant properties of selected 4-phenyl hydroxycoumarins: Integrated in vitro and computational studies." Chemico-biological interactions 214 (2014): 49-56.

Wen, G., et al. "Vulcanization characteristics of asphalt/SBS blends in the presence of sulfur." Journal of applied polymer science 82.4 (2001): 989-996.

Wen, G., et al. "Improved properties of SBS-modified asphalt with dynamic vulcanization." Polymer Engineering & Science 42.5 (2002): 1070-1081.

Wright, J. S., et al. "Theoretical calculation of substituent effects on the O—H bond strength of phenolic antioxidants related to vitamin E." Journal of the American Chemical Society 119.18 (1997): 4245-4252.

Wright, J. S., et al. "Predicting the activity of phenolic antioxidants: theoretical method, analysis of substituent effects, and application to major families of antioxidants." Journal of the American Chemical Society 123.6 (2001): 1173-1183.

Zhang, Y., et al. "Inverse vulcanization of elemental sulfur and styrene for polymeric cathodes in Li—S batteries." Journal of Polymer Science Part A: Polymer Chemistry 55.1 (2017): 107-116.

Zhang, J., et al. "Characterization of crack growth rate of sulfur-extended asphalt mixtures using cyclic semicircular bending test." Journal of Materials in Civil Engineering 30.12 (2018): 04018311, pp. 1-11.

Zhang, Yueyan, et al. "Recent advances in the polymerization of elemental sulphur, inverse vulcanization and methods to obtain functional Chalcogenide Hybrid Inorganic/Organic Polymers (CHIPs)." Polymer Chemistry 10.30 (2019): 4078-4105.

Zhang, J., et al. "Characterisation of rheological properties of sulfur-extended asphalt with/without crumb rubber." International Journal of Pavement Engineering 23.5 (2022): 1491-1499.

Zhou, T., et al. "Effect of sulfur on bio-modified rubberized bitumen." Construction and Building Materials 273 (2021): 122034, pp. 1-11.

Cocurullo, A.; Grenfell, J.; Yusof, N. I. M.; Airey, G. In Fatigue characteristics of sulphur modified asphalt mixtures, 7th RILEM International Conference on Cracking in Pavements, Springer: 2012; pp. 783-792.

Fritschy, G.; Papirer, E.; Chambu, C., Sulfur modified bitumen: A new binder. Rheologica Acta 1981, 20 (1), 78-84.

Abdullah et al., "Identification of Hydrophilic Phenolic Compounds Derived from Palm Oil Products," Journal of Oil Palm Research, Jun. 2020, 32(2):258-270.

Maria et al., "Peanut oil: Compositional data," Review Article European Journal of Lipid Science and Technology, Jul. 2010, 112(7):697-707.

Ng et al., "Detection of cis-Vaccenic Acid in Palm Oil by 13C NMR Spectroscopy," Lipids, 1988, 23:140-143.

Pomerantz et al., "Sulfur speciation in kerogen and bitumen from gas and oil shales," Organic Geochemistry, Dec. 2013, 68(31):5-12.

Simone Alves da Silva, Polycyclic aromatic hydrocarbons content and fatty acids profile in coconut, safflower, evening primrose, and linseed oils, 2018, Food Chemistry (Elsevier), 798-805. (Year: 2018).

* cited by examiner

7-WP

3-WP

1-WP

4-WP

1-CS

10-WP $\Delta G = + 7.0$ kcal/mol
$\Delta G^{\ddagger} = 13.2$ kcal/mol $\Delta G = + 2.9$ kcal/mol
$\Delta G^{\ddagger} = 11.4$ kcal/mol $\Delta G = -3.2$ kcal/mol
$\Delta G^{\ddagger} = 2.9$ kcal/mol Relative Free Energy (kcal/mol)

FIG. 11

ALGAE-RESISTANT BITUMEN-CONTAINING MATERIALS

CROSS-REFERENCE TO RELATED APPLICATION

This application claims the benefit of U.S. Patent Application No. 63/292,680 filed on Dec. 22, 2021, which is incorporated herein by reference in its entirety.

STATEMENT OF GOVERNMENT SUPPORT

This invention was made with government support under 1928807 awarded by the National Science Foundation. The government has certain rights in the invention.

TECHNICAL FIELD

This invention relates to self-cleaning algae resistant bitumen using photoactive and antibacterial sulfur in combination with phenol-rich bio-oils.

BACKGROUND

Bitumen is a substance produced through the distillation of crude oil that is used for its waterproofing and adhesive properties. Bitumen production through distillation removes lighter crude oil components, such as gasoline and diesel, leaving the "heavier" bitumen behind. The bitumen can be refined several times to improve its grade. Bituminous composites are used to construct roads, runways, bridge decks, and roofs, and are used in the fabrication of roofing shingles.

SUMMARY

This disclosure describes modification of bitumen with sulfur (e.g., industrial waste sulfur) to yield sulfur-extended bitumen. The sulfur-extended bitumen has improved mechanical characteristics and increased durability compared to unmodified bitumen. Phenol-rich bio-oils can be added to this sulfur-extended bitumen composite to hinder sulfur crystallization in the bulk bitumen and increase sulfur blooming at the surface of items made with this bitumen, including building component such as roofing shingles.

Self-regenerative sulfur blooms at the surface of building components such as roofing shingles increase building albedo and are hydrophobic and thus reduce moisture damage. Other advantages include the prevention of algal growth on bitumen-containing building materials using a self-regenerative sulfur bloom layer. Replacing a portion of bitumen with elemental sulfur can reduce the carbon footprint of bitumen production and result in cost savings.

In a first general aspect, a modified bitumen composition includes bitumen, biomass oil including one or more phenolic compounds, and added sulfur. The modified bitumen composition includes between about 5 wt % and about 25 wt % of the added sulfur, at least some of the added sulfur is present as polysulfide chains, and at least some of the one or more phenolic compounds are configured to covalently bind to the polysulfide chains.

Implementations of the first general aspect can include one or more of the following features.

The modified bitumen composition can include between about 10 wt % and about 20 wt % of the added sulfur. In some cases, the biomass oil includes plant-based bio-oil. In some implementations, the plant-based bio-oil includes castor oil, corn stover oil, miscanthus oil, wood pellet oil, vegetable oil, or a combination thereof. The one or more phenolic compounds can include one or more of 2,6-dimethoxy phenol, 5-tert-butylpyrogallol, homosyringaldehyde, trans-isoeugenol, 4-ethylphenol, 2-methoxy phenol, or a combination thereof. In some cases, the added sulfur includes about 70 wt % to about 90 wt % crystalline sulfur.

A roadway can include the modified bitumen of the first general aspect. In some cases, a building material includes the modified bitumen of the first general aspect. In some implementations, the building material includes roofing shingles. In some cases, the roofing shingles demonstrate self-regenerative sulfur blooms during use. The roofing shingles can be algae-resistant relative to roofing shingles including unmodified bitumen. In some cases, roofing shingles include the modified bitumen of the first general aspect.

In a second general aspect, making a modified bitumen includes combining bitumen and elemental sulfur to yield sulfur-extended bitumen, and combining the sulfur-extended bitumen with biomass oil including one or more phenolic compounds to yield the modified bitumen.

Implementations of the second general aspect can include one or more of the following features.

The modified bitumen can include between about 5 wt % and about 25 wt % of the elemental sulfur. In some cases, at least some of the elemental sulfur is present as polysulfide chains, and at least some of the one or more phenolic compounds are configured to covalently bind to the polysulfide chains. In some implementations, the biomass oil includes plant-based bio-oil. In some implementations, the plant-based bio-oil includes castor oil, corn stover oil, miscanthus oil, wood pellet oil, vegetable oil, or a combination thereof. The modified bitumen can include between about 10 wt % and about 20 wt % of the elemental sulfur. In some cases, the one or more phenolic compounds include one or more of 2,6-dimethoxy phenol, 5-tert-butylpyrogallol, homosyringaldehyde, trans-isoeugenol, 4-ethylphenol, and 2-methoxy phenol. In some implementations, the elemental sulfur includes about 70 wt % to about 90 wt % crystalline sulfur.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 11 illustrates the resonance stabilization mechanism of a phenoxyl radical.

DETAILED DESCRIPTION

Figure 1A:
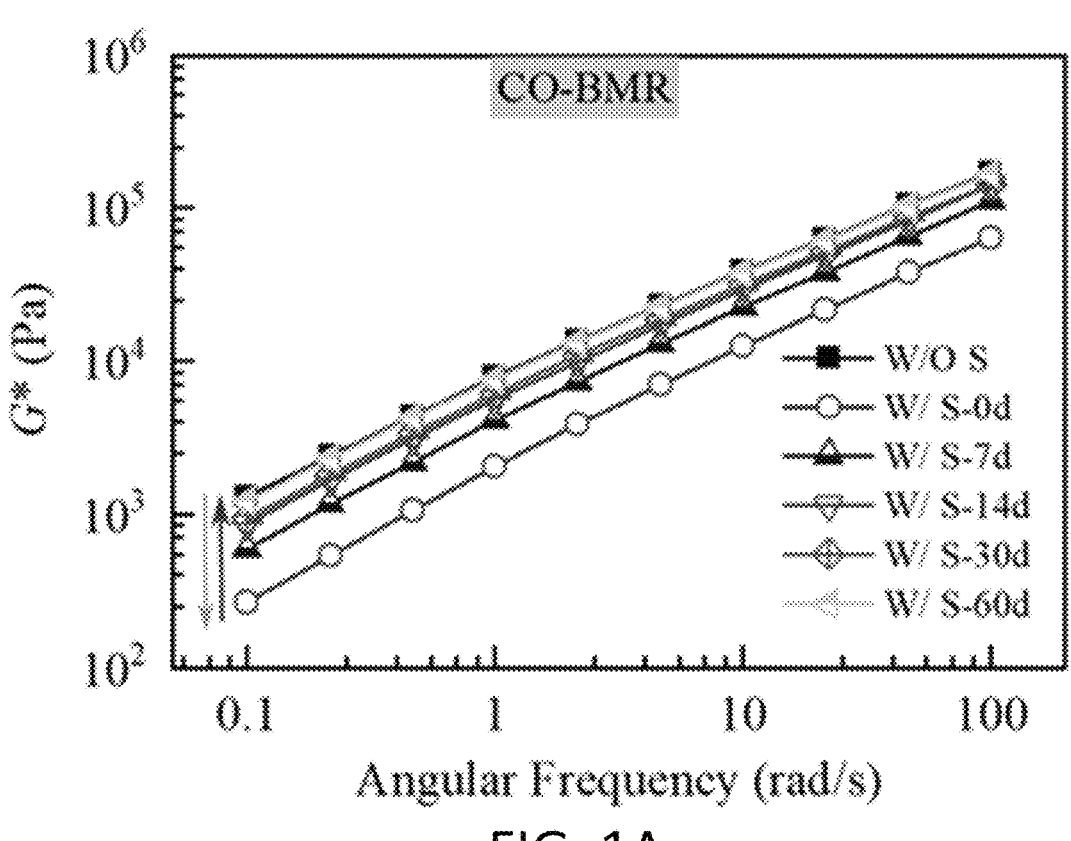
FIGS. 1A-1E show the complex modulus at 52° C. of sulfur-extended bio-modified rubber (BMR) bitumen mixtures modified with castor oil (CO), corn stover (CS), miscanthus (MS), wood pellet (WP), and waste vegetable oil (WVO), respectively, without sulfur (W/O S) or with sulfur (W/S), from 0 days to 60 days curing at room temperature.
Figure 1B:
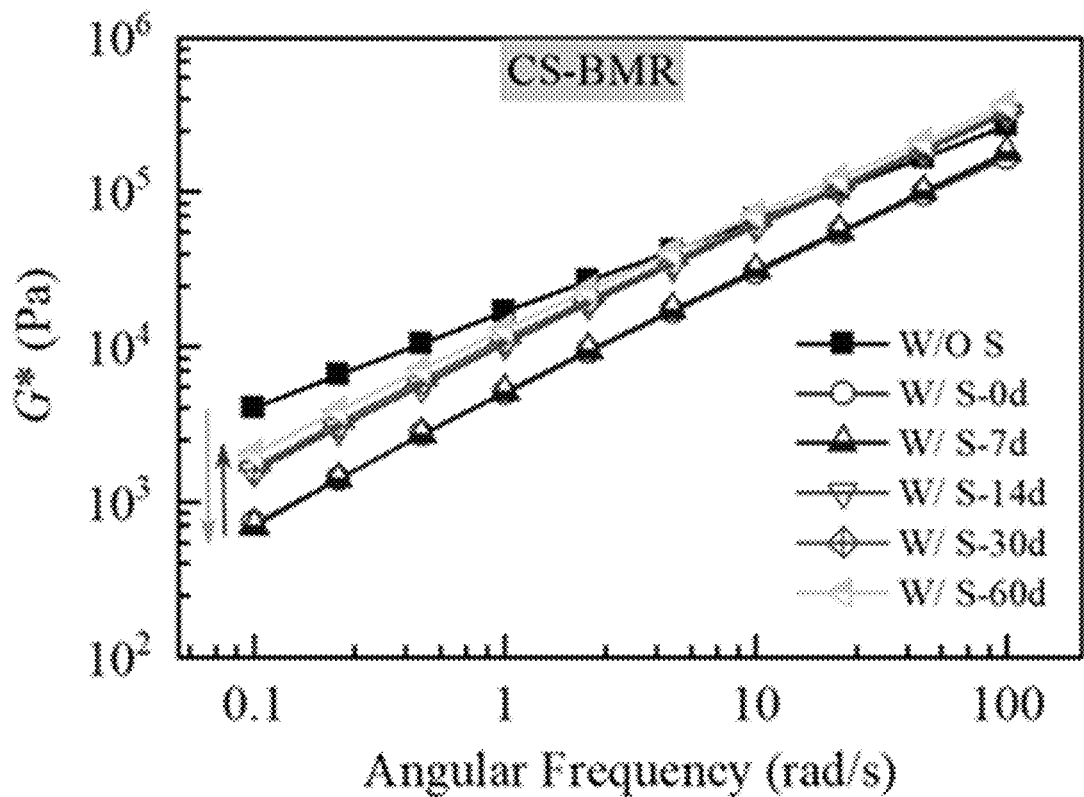
Figure 1C:
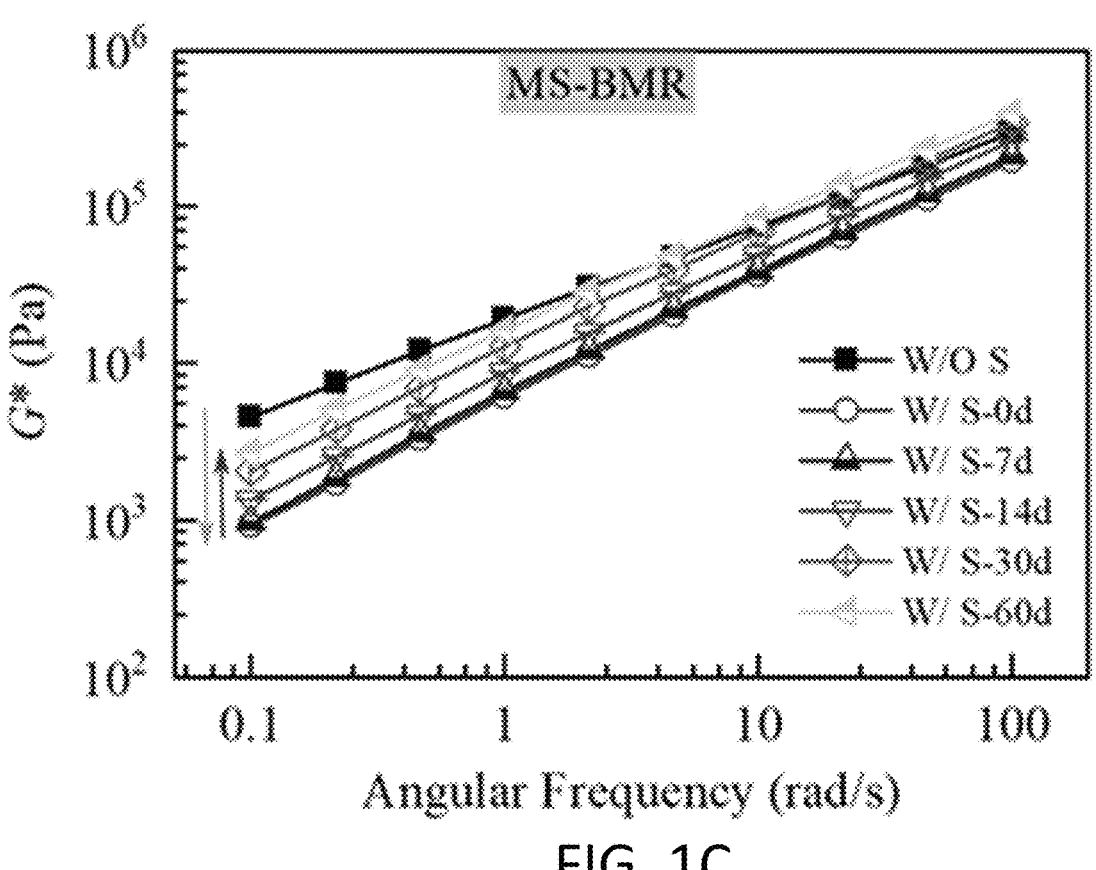

Extending bitumen by adding sulfur reduces the consumption of limited petroleum crude oil reserves and reduces the cost of bituminous composites. In addition, the use of sulfur in bitumen mixtures can improve mechanical characteristics and increase durability of sulfur-modified bitumen (e.g., in bitumen-containing building structures) compared to unmodified bitumen. In one example, algae has detrimental effects on bitumen-containing building structures, roof aesthetics, and energy-related characteristics of a roof. This can be a problem in areas with warm, wet climates. For example, black streaks due to algal growth alter the appearance of roofing shingles and decrease their durability and service life.

The addition of sulfur to bitumen can lead to the production of softer bitumen by increasing penetration and ductility and decreasing the softening point. In some cases, a majority of sulfur introduced to bitumen appears in a microcrystalline state, which can increase the stiffness of bitumen. The mechanical improvement in sulfur-modified bitumen is due at least in part to the crystalized sulfur in the bitumen acting as a reinforcing filler. The lower amount of remaining (uncrystallized) sulfur is in a dissolved, dispersed state that can react with organic compounds in bitumen and thereby increase its plasticity.

Over time, the sulfur in bitumen can migrate to the surface and form areas called sulfur blooms. Due at least in part to the hydrophobic properties of sulfur, blooms can provide a self-cleaning surface layer for bituminous composites, thereby reducing moisture damage and oxidative aging and promoting sustainability of bitumen-containing building components, such as roadways. Sulfur blooming at the bitumen-air interface can be self-regenerating if enough dissolved sulfur remains in the bitumen bulk. Thus, modifying bitumen with organic compounds that have the capability for radical scavenging can stabilize polymeric sulfur radicals in the bulk phase and hinder their crystallization, subsequently providing the opportunity for sulfur to migrate to the surface and bloom. Phenol-rich bio-oils can be added to sulfur-modified bitumen composites to hinder sulfur crystallization and increase sulfur blooming at surface. Regenerative hydrophobic sulfur blooms can be formed on bitumen-containing building components (e.g., roofing shingles), and the photodegradation properties of the sulfur bloom can impart algae growth resistance to the shingles.

Analyzing the thermal behavior of sulfur in the bulk phase at high temperatures is useful to optimize the rheological properties of bitumen by controlling the dissolved and crystallized phases of sulfur. Elemental sulfur has several crystalline and molecular forms. The thermodynamically stable form of sulfur at room temperature is the rhombic stacking of $S_8$, the orthorhombic ($\alpha$-$S_8$) crystal. This crystal is slowly converted to the monoclinic ($\beta$-$S_8$) crystal in a temperature range of 95° C.-119° C. The melting point of the monoclinic crystal is 119° C., at which point liquid sulfur is predominantly $S_8$ rings. Upon continued heating of the molten sulfur to 159° C., the $S_8$ rings undergo "ring-opening polymerization" to form polysulfide chains. Thermal scission of the S—S bond in a sulfur ring provides an unstable radical that opens the ring of another $S_8$. The instability of polymeric sulfur at temperatures higher than 159° C. is due at least in part to its terminal radicals, which readily promote "ring-closing depolymerization" back to $S_8$ cyclic molecules.

Homolytic scission of S—S bonds and the consequent reactions with organic molecules can occur at temperatures below 159° C. Therefore, there is a sufficient concentration of sulfur radicals at the temperatures typically used for asphalt mixing (135° C.-150° C.) to initiate sulfur's reaction with organic molecules in sulfur-extended bitumen. In this condition, sulfur radicals participate in addition reactions with the unsaturated part of active bitumen fragments to form organo-sulfides, and the remaining sulfur molecules appear in the form of microcrystals in the asphalt system. Of the most representative fractions of bitumen (saturates, asphaltenes, resins, and naphthene-aromatics), naphthene aromatics, including nonpolar polyaromatics, can have the greatest potential to chemically interact with sulfur. Sulfur's contribution to the naphthene-aromatic fraction increases ductility, leading to better performance of the bitumen.

The asphaltene fraction of bitumen is also a target for the reaction with dissolved sulfur. In sulfurized bitumen with a high content of sulfur, unreacted sulfur molecules are prone to oxidation and subsequent acid deposition through their interaction with water molecules. However, a majority (e.g., more than 50%) of unreacted sulfur in the bitumen can crystalize in the bitumen mixture, contributing to an increase in the bitumen's stiffness. Sulfur in some crystalline morphologies (such as $\alpha$-sulfur crystals of $S_8$) can act as an elemental photocatalyst. The photoexcited holes in the valence band of the $\alpha$-S crystal structure have the ability to generate •OH radicals by oxidizing surface-adsorbed hydroxyl groups and water under visible-light as well as UV-Vis irradiation. Thus, sulfur crystallization in bitumen can make oxidative aging worse by producing more free radicals.

Analysis of sulfur-containing bitumen reveals that sulfur crystallization happens over time. However, the extent of this phenomenon and the proportion of crystalline sulfur can depend on the sulfur concentration. The addition of elemental sulfur at concentrations higher than 10 wt % to bitumen can result in the formation of a discrete phase that is amorphous, not crystalline. At sulfur concentrations between 10 wt % and 20 wt %, the self-assembly of the amorphous phase of sulfur can lead to the formation of "dendritic" structures over time. Along with the presence of dendritic structures, the crystalline-sulfur phase can appear in bitumen mixtures containing sulfur concentrations greater than 20 wt %. Thus, sulfur crystallization in bitumen mixtures can be seen after a threshold concentration of sulfur is reached. The self-assembly of amorphous sulfur (dendritic structuring) can impact the properties of bitumen. The stiffness of bitumen containing one or both of these two phases can increase over time; however, the increase in stiffness over time is typically higher in bitumen with amorphous sulfur than in bitumen with crystalline sulfur. This difference can be attributed to more self-assembly of amorphous sulfur in the shape of dendritic structures over time.

To provide stable polysulfide chains and hinder their self-assembly or crystallization in the bitumen bulk, the S-centered radicals can be quenched before backward depolymerization to thermodynamically favored $S_8$ cyclic molecules or the self-assembly of sulfur radical chains. Alkenes or polyenes can provide this stability in the bulk. The presence of phenolic compounds in bio-modified bitumen activates sulfur interactions in bitumen. Thus, bio-oils containing a high concentration of phenolic compounds can amplify the effect of sulfur on the thermo-mechanical properties of bitumen.

This disclosure describes the thermo-mechanical properties of sulfur-modified bitumen mixed with different plant-based bio-oils. The extent of both sulfur crystallization and the self-assembly of sulfur radical chains can influence the rate of change in bitumen's properties and its recovery of stiffness. The molecular-composition dependency of sulfur crystallization in bio-modified bitumen is described, as well as the performance of phenolic compounds as radical scavengers to stabilize polysulfide radicals and hinder self-assembly of amorphous sulfur into the microcrystalline state and dendritic structures. The mechanisms by which phenolic compounds are believed to scavenge polysulfide radicals, in addition to the structure-activity relationship of phenolic scavengers, are described. Density functional theory calculations are used to explain the experimental results and predict molecular interactions between phenolic compounds and radical chains of sulfur. Electronic parameters controlling the activity of phenolic compounds as radical scavengers are also described.

The modified bitumen composition includes bitumen, biomass oil including one or more phenolic compounds, and added sulfur. As used herein, "added sulfur" generally refers to sulfur other than that naturally present in the bitumen or biomass oil. The modified bitumen composition typically includes between about 5 wt % and about 25 wt % of the added sulfur (e.g., between about 10 wt % and about 20 wt % of the added sulfur). At least some of the added sulfur is present as polysulfide chains, and at least some of the one or more phenolic compounds are selected to covalently bind to the polysulfide chains. By covalently binding to the polysulfide chains, the phenolic compounds can prevent sulfur self-assembly that results in the formation of microcrystals and dendritic structures that can degrade the properties of the bitumen. The biomass oil can include plant-based bio-oil (e.g., castor oil, corn stover oil, miscanthus oil, wood pellet oil, vegetable oil, or any combination thereof). The efficacy of the biomass oils in preventing sulfur self-assembly can be controlled at least in part by the type of phenolic compounds in each. The phenolic compounds included in the biomass oil can include one or more of 2,6-dimethoxy phenol, 5-tert-butylpyrogallol, homosyringaldehyde, trans-isoeugenol, 4-ethylphenol, 2-methoxy phenol, or a combination thereof.

The addition of sulfur to bitumen can decrease stiffness and increase durability of the modified bitumen relative to unmodified bitumen. The modified bitumen composition can include crystalline sulfur, and the added sulfur can include between about 70 wt % and about 90 wt % of the crystalline sulfur. Roadways can include the modified bitumen. Building materials (e.g., roofing shingles) can include the modified bitumen. Roofing shingles made with the modified bitumen demonstrate self-regenerative sulfur blooms during use that impart increased algae-resistance relative to roofing shingles made with unmodified bitumen. The self-regenerative sulfur blooms can also increase building albedo and are hydrophobic and thus can reduce moisture damage to the shingles over time.

A method of making a modified bitumen includes combining bitumen and elemental sulfur to yield sulfur-extended bitumen, and combining the sulfur-extended bitumen with biomass oil including one or more phenolic compounds to yield the modified bitumen. The modified bitumen can include between about 5 wt % and about 25 wt % of the elemental sulfur (e.g., between about 10 wt % and about 20 wt % of the elemental sulfur). The elemental sulfur can include about 70 wt % to about 90 wt % crystalline sulfur. At least some of the elemental sulfur can be present as polysulfide chains, and at least some of the one or more phenolic compounds are configured to covalently bind to the polysulfide chains.

EXAMPLES

Materials. Rubberized bitumen typically used in the western United States (PG 64-22) was selected as the base bitumen. Table 1 lists basic properties of PG 64-22. All samples were modified with 10% elemental sulfur to produce sulfur-extended bitumen. Phenolic compounds were sourced from five bio-oils, each derived from one of these five sources: castor oil (CO), corn stover (CS), miscanthus (MS), wood pellet (WP), and waste vegetable oil (WVO). All laboratory mixing was performed at a temperature of 155±5° C. for 30 minutes using a mixer at 1000 rpm. The change in properties for each specimen was monitored at room temperature for 60 days.

TABLE 1

| Basic properties of PG 64-22. | |
| --- | --- |
| Properties | Values |
| Specific gravity @15.6° C. | 1.041 |
| Cleveland open cup method flash point | 335° C. |
| Mass change after rolling thin-film oven | −1.3% |
| Absolute viscosity @ 60° C. | 179 Pa · s |

Rheometry. An Anton Paar Modular Compact Rheometer MCR 302 was used to measure the viscous and elastic properties of the bitumen samples, following the standard test methods of ASTM D7175-15. Frequency sweeps were conducted at 52° C. and an angular frequency range of 0.1-100 rad/s, using an 8-mm-diameter parallel-plate geometry. From the data, the complex shear modulus (G*) was calculated using Eq. 1

$$G^* = \frac{\tau_{max}}{\gamma_{max}} \qquad (1)$$

in which $$\tau_{max} = \frac{2T}{\pi r^3} \text{ and } \gamma_{max} = \left(\frac{\theta r}{h}\right).$$

where $\gamma_{max}$ is maximum strain, $\tau_{max}$ is maximum stress, T is maximum applied torque, r is radius of the sample, $\theta$ is deflection (rotational) angle, and h is the height of the sample.

Quantum Mechanical Calculations. To evaluate the interaction tendency between sulfur and phenolic compounds, quantum-mechanical calculations and molecular modeling were conducted using density functional theory (DFT) computational approaches. The theoretical calculations were performed using a spin-unrestricted DFT technique available in the Gaussian 16 package. Becke's three-parameter hybrid exchange functional and the Lee-Yang-Parr' correlation functional (B3LYP) were used as the density functional. The basis set assigned for all atoms in the optimization process had a double-$\xi$ quality augmented with one polarization function of 6-31G*. Frequency calculations at the same level of theory were performed to confirm stationary points as transition states (with one imaginary frequency) or minima (with no imaginary frequency) and to include zero-point vibrational corrections to the electronic energy. Intrinsic reaction coordinate (IRC) analysis was used to confirm that the obtained transition state (TS) structures connect the correct minima (reactants and products). The resulting energies are Gibbs free energies (G) that include zero-point energies, thermal corrections, and also the entropic factor. Calculations of Gibbs free energy of reactants, transition states, and products involved in the proposed mechanisms were performed to reflect the favorability of reactions. The reaction between phenolic compounds and polysulfide radicals is thermodynamically preferred if the change in free energy ($\Delta G$) given by Eq. 2 is negative.

$$\Delta G = G(\text{products}) - G(\text{reactants}) \qquad (2)$$

To predict the reactivity of phenolic compounds toward inactivation of polysulfide radicals, the overall free energy profile of the reaction mechanism and corresponding activation energy for selected phenolic compounds were assessed. Activation energy is generally defined as the energy level that reactants should overcome for the reaction to occur.

Rheometry Analysis. The dynamic frequency sweep test for all sulfur-modified bitumen samples mixed with different plant-based bio-oils was conducted at 52° C. Dynamic shear rheometry (DSR) results for the complex modulus (G*) versus angular frequency are shown in FIGS. 1A-1E for sulfur-extended bitumen mixtures modified with castor oil (CO), corn stover (CS), miscanthus (MS), wood pellet (WP), and waste vegetable oil (WVO) bio-oil, respectively, without sulfur (W/O S) or with sulfur (W/S), from 0 days to 60 days curing at room temperature.

Figure 1D:
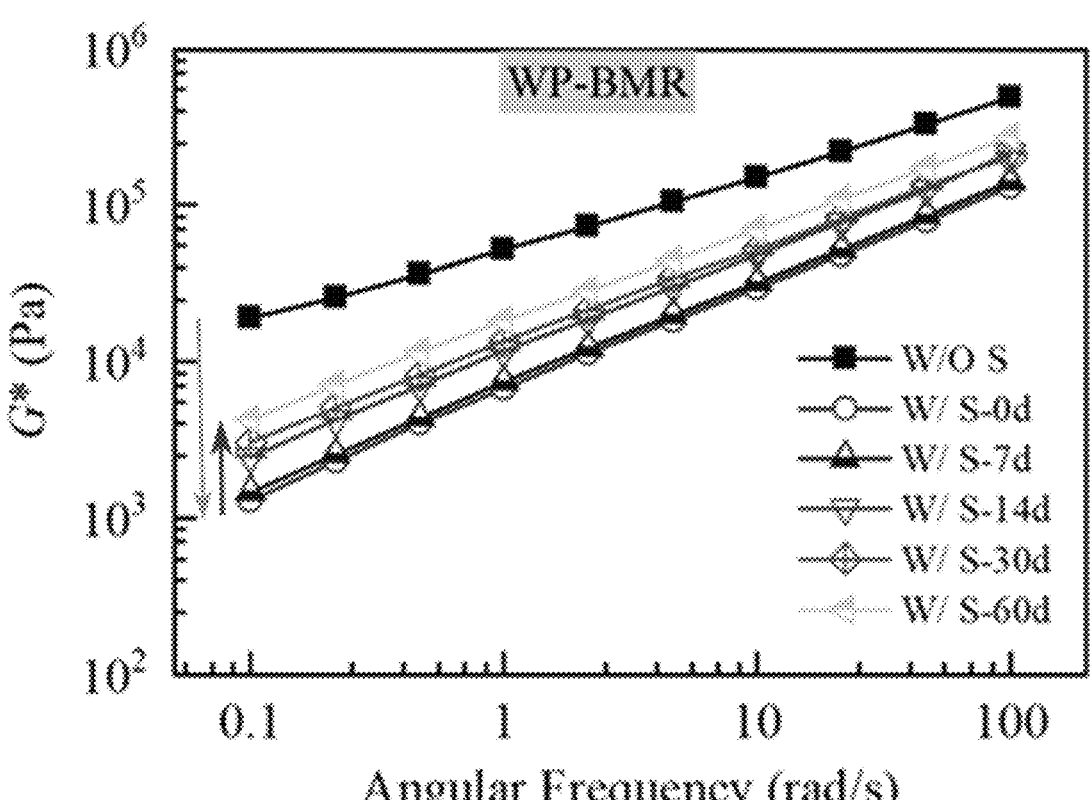
Figure 1E:
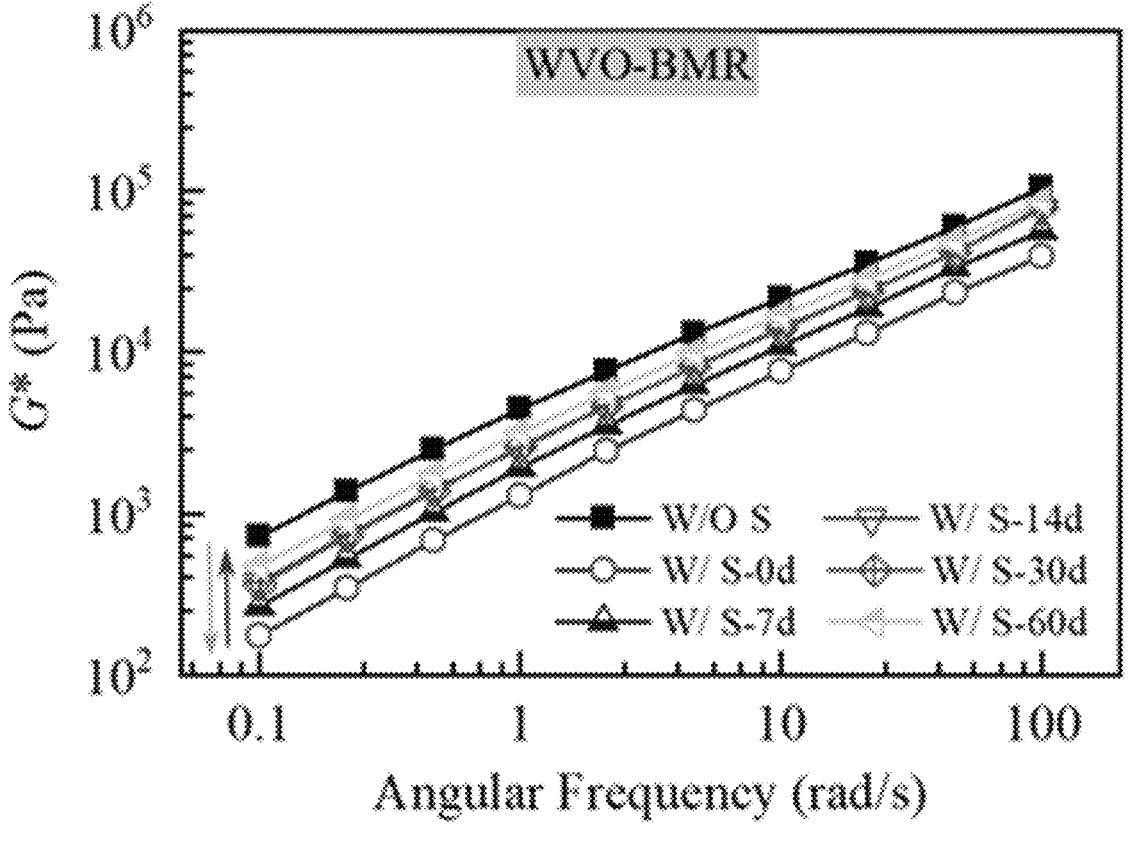

The immediate decrease in G* (W/S-0d) shows that the addition of sulfur to all bio-modified samples reduced the stiffness of bitumen considerably (indicated by downward arrows in the G* plots). However, the softening effect of incorporating sulfur in the WP mixture is greatest. This improvement can be attributed to the plasticity induced by sulfur dissolved in the bitumen. As time elapses, sulfur-containing samples show some sort of stiffness recovery, approaching the G* values of the zero-sulfur samples, W/O S (indicated by upward arrows in the G* plots). The recovery rate depends at least in part on the molecular composition of the bio-modified bitumen. The mixture with bio-oil derived from wood pellet, WP, showed the least recovery of modulus and persistent softening as shown in FIG. 1D. Plots shown in FIGS. 1A and 1E indicate that the mixtures containing CO oil and WVO oil, respectively, show the highest G* increase from 0 days to 60 days. The loss of softening over curing time in the sulfur-added mixtures can be due to sulfur crystallization in the bulk. A possible explanation for the low recovery rate for WP-sulfur bitumen is the presence of some typical compounds that are able to deter sulfur crystallization and self-assembly, keeping the sulfur content dissolved. Lower concentrations of these molecules may be present in the MS and CS bio-oils.

A distinctive feature of WP bio-oil compared to the other bio-oils is the high concentration of phenolic compounds in WP bio-oil. The phenolic compounds can act as an activator for the sulfur added to the bituminous matrix, increasing the effect of the sulfur on bitumen's properties. In addition, the role of phenolic compounds in hindering sulfur crystallization in the sulfur-modified mixtures can be due at least in part to their ability to scavenge free radicals. Considerable interaction between phenolic compounds and polysulfide radicals can deactivate these unstable radicals and consequently keep them from self-assembly. Therefore, bitumen modified by bio-oils with less (CS and MS) or zero (CO and VWO) contribution of phenolic molecules in their chemical composition may experience a greater degree of sulfur crystallization compared to bitumen modified by WP bio-oil.

Gas Chromatography/Mass Spectrometry (GC/MS). The chemical composition of a bio-oil can be affected by the characteristics of the feedstock, influencing the bio-oil's ability to control the changes in properties of the sulfur-modified bitumen over time. Based on the GC-MS peak area percentage of the molecular fragments detected by mass spectrometry, the bio-oils produced from the five plant-based sources are complex mixtures of various compounds, and phenolic compounds contribute to the chemical compositions of WP, MS, and CS oils. As shown in Table 2, the phenolic compounds in WP bio-oil contribute to at least 54% of the total peak area; the contribution of phenolic compounds in CS and MS oils is lower (e.g., 41% and 33%, respectively). This indicates the presence of more radical scavengers in bio-oil extracted from WP oil compared to CS and MS oils, since the phenolic content of plant-based bio-oils shows hydroxyl (O—H) and methoxy (O-Me) substituents are the main functional groups affecting the reactivity of phenols to trap radicals.

TABLE 2

Phenolic content of wood pellet, miscanthus, and corn stover oil.

|  | Wood Pellet (WP) | Formula | Area % |
|---|---|---|---|
| 1 | Phenol, 2,6-dimethoxy- | $C_8H_{10}O_3$ | 12 |
| 2 | 3,5-Dimethoxy-4-hydroxytoluene | $C_9H_{12}O_3$ | 9.8 |
| 3 | 5-tert-Butylpyrogallol | $C_{10}H_{14}O_3$ | 8.4 |
| 4 | Phenol, 2-methoxy- | $C_7H_8O_2$ | 5 |
| 5 | Creosol | $C_8H_{10}O_2$ | 4.8 |

TABLE 2-continued

| Phenolic content of wood pellet, miscanthus, and corn stover oil. | | | |
|---|---|---|---|
| | Wood Pellet (WP) | Formula | Area % |
| 6 | Phenol, 4-ethyl-2-methoxy- | $C_9H_{12}O_2$ | 4.4 |
| 7 | Homosyringaldehyde | $C_{10}H_{12}O_4$ | 3.6 |
| 8 | Phenol, 3-methyl- | $C_7H_8O$ | 1.8 |
| 9 | Syringylacetone | $C_{11}H_{14}O_4$ | 1.7 |
| 10 | trans-Isoeugenol | $C_{10}H_{12}O_2$ | 1.5 |
| 11 | Phenol, 2-methoxy-4-propyl- | $C_{10}H_{14}O_2$ | 1.4 |
| | | | 54.4% |
| | Miscanthus (MS) | | |
| 1 | Phenol, 4-ethyl- | $C_8H_{10}O$ | 6.8 |
| 2 | Phenol, 2-methoxy- | $C_7H_8O_2$ | 5.2 |
| 3 | Phenol, 4-ethyl-2-methoxy- | $C_9H_{12}O_2$ | 4.9 |
| 4 | Phenol, 3-methyl- | $C_7H_8O$ | 4 |
| 5 | Phenol | $C_6H_6O$ | 3.5 |
| 6 | 2-Methoxy-4-vinylphenol | $C_9H_{10}O_2$ | 2.3 |
| 7 | Creosol | $C_8H_{10}O_2$ | 2.2 |
| 8 | Phenol, 2,6-dimethoxy- | $C_8H_{10}O_3$ | 2.1 |
| 9 | Phenol, 2-methyl- | $C_7H_8O$ | 2.1 |
| | | | 33.1% |
| | Corn Stover (CS) | | |
| 1 | Phenol, 4-ethyl- | $C_8H_{10}O$ | 13 |
| 2 | Phenol | $C_6H_6O$ | 7 |
| 3 | Phenol, 2-methoxy- | $C_7H_8O_2$ | 6 |
| 4 | Phenol, 4-ethyl-2-methoxy- | $C_9H_{12}O_2$ | 4 |
| 5 | Phenol, 2,6-dimethoxy- | $C_8H_{10}O_3$ | 4 |
| 6 | Phenol, 2-methyl- | $C_7H_8O$ | 3 |
| 7 | Creosol | $C_8H_{10}O_2$ | 2 |
| 8 | Phenol, 3-ethyl-5-methyl- | $C_9H_{12}O$ | 2 |
| | | | 41% |

Figure 2:
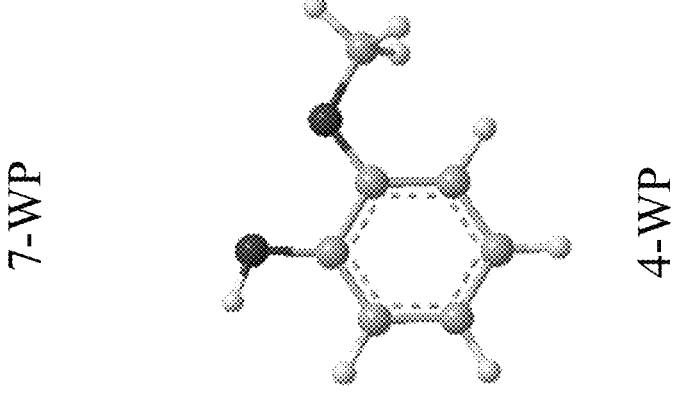
FIG. 2 depicts the molecular structures of the most prominent phenolic compounds in WP, CS, and MS bio-oils: 2,6-dimethoxy phenol (1-WP); 5-tert-butylpyrogallol (3-WP); homosyringaldehyde (7-WP); trans-isoeugenol (10-WP); 4-ethyl phenol (1-CS); and 2-methyl phenol (4-WP).
Figure 2:
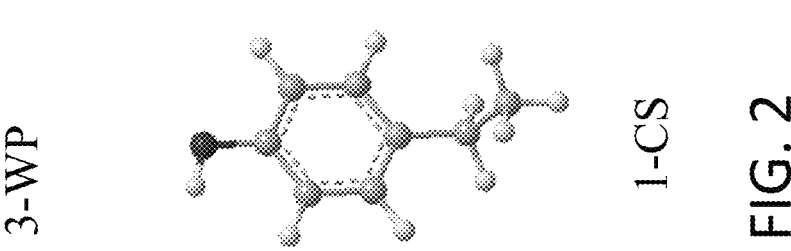
Figure 2:
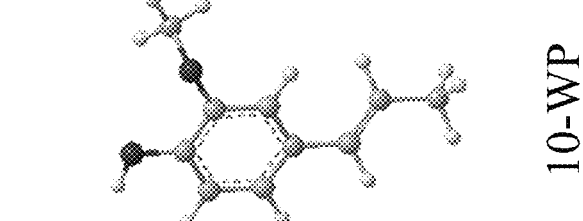

The efficacy of the bio-oils in preventing sulfur self-assembly can be controlled at least in part by the dominant type of phenolic compounds in each. The electronic properties and parameters for radical-scavenging activity of phenolic compounds shown FIG. 2 and described in Table 2 were assessed. From Table 2, 1-CS is also the most abundant phenolic compound in MS oil, and 4-WP molecule is common between WP, CS, and MS oil.

DFT-Based Molecular Modeling. The target for DFT calculations is modeling the interactions between polysulfide radical chains and the phenolic compounds available in the used bio-oils. The mechanism by which phenolic compounds prevent the formation of sulfur dendritic structures and crystallization in the bulk and whether certain phenols are better than others at scavenging sulfur-centered radicals can be used to explain the reduced recovery of stiffness during curing time in high-sulfur bitumen when phenolic compounds are present. Using DFT analysis to identify the phenolic compounds that interact with polysulfide chains aid in optimizing the capability of the bio-oils to prevent sulfur crystallization in the bulk from affecting the bitumen's properties.

Potential Mechanisms for Stabilization of Polysulfide Radical Chains in the Bitumen Bulk. The activity of phenolic compounds as radical scavengers is expressed at least in part by their ability to donate hydrogen to a polysulfide radical through a hydrogen atom transfer (HAT) mechanism and the ability of the produced phenoxyl radicals to interact with more sulfur-centered radicals. The hydroxyl group in a phenolic molecular structure is a main center, with the antioxidant ability to neutralize the O-centered free radicals. Whether the radical-trapping feature of the phenolic compound at the center of a hydroxyl group is also capable of neutralizing a polysulfide radical, $\cdot S—(S)_n—S\cdot$ can be determined. The polymeric elemental sulfur used to assess the possible interactions with phenols is a tetrameric sulfur radical, $\cdot S—S_2—S\cdot$. This modeling is based on the homolytic cleavage of sulfur bonds in the cyclic sulfur allotropes. In a tetrameric sulfur radical, one of the reactive heads is quenched by a hydrogen atom, $H—S_3—S\cdot$. The other sulfur terminal radical is quenched with a phenolic hydrogen or a phenoxyl radical.

Figure 3:
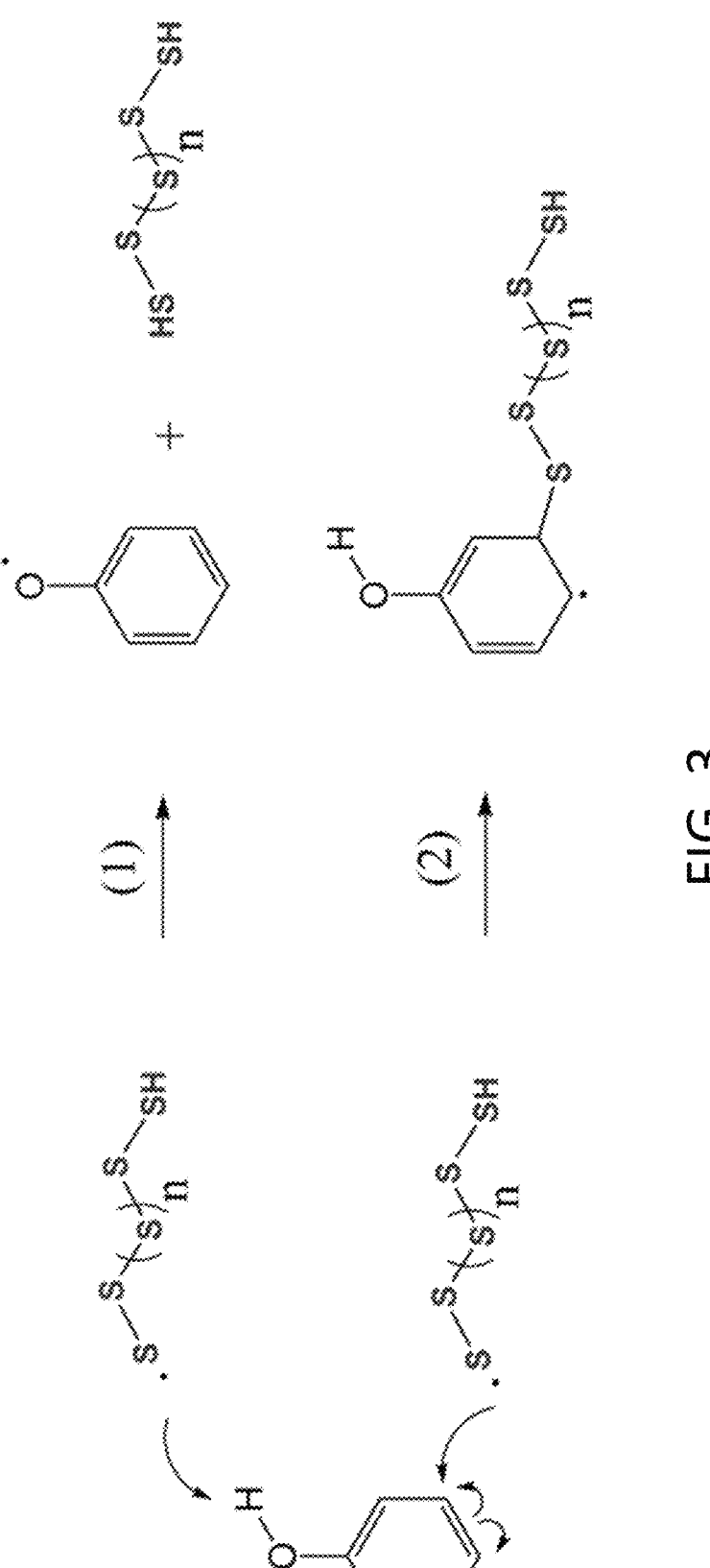
FIG. 3 illustrates two possible initial mechanisms to neutralize a polysulfide radical by a phenolic compound.

Possible mechanisms to neutralize a polysulfide radical at its first confrontation with a phenolic compound are considered. A first mechanism is hydrogen abstraction from the phenolic hydroxyl group by sulfur-centered radicals, leading to a phenoxyl radical (ArO·) as depicted in FIG. 3, reaction 1. This mechanism is based at least in part on the participation of phenolic compounds in the antioxidation reaction that supplies a hydrogen atom through a hydrogen atom transfer (HAT) mechanism to deactivate free radicals and terminate the chains from radical growth. A second mechanism is the reaction of a polysulfide radical with a cyclic C=C in the phenolic structure depicted in FIG. 3, path 2. This forms a carbon-centered radical inside the ring that can then undergo an interaction involving C-center radical addition to the second sulfur-chain radical. To understand the chemistry involved in these reactions and determine whether the proposed mechanisms are thermodynamically favorable, the potential energy surface (PES) is sampled in a region corresponding to the process of interest.

Figure 4:
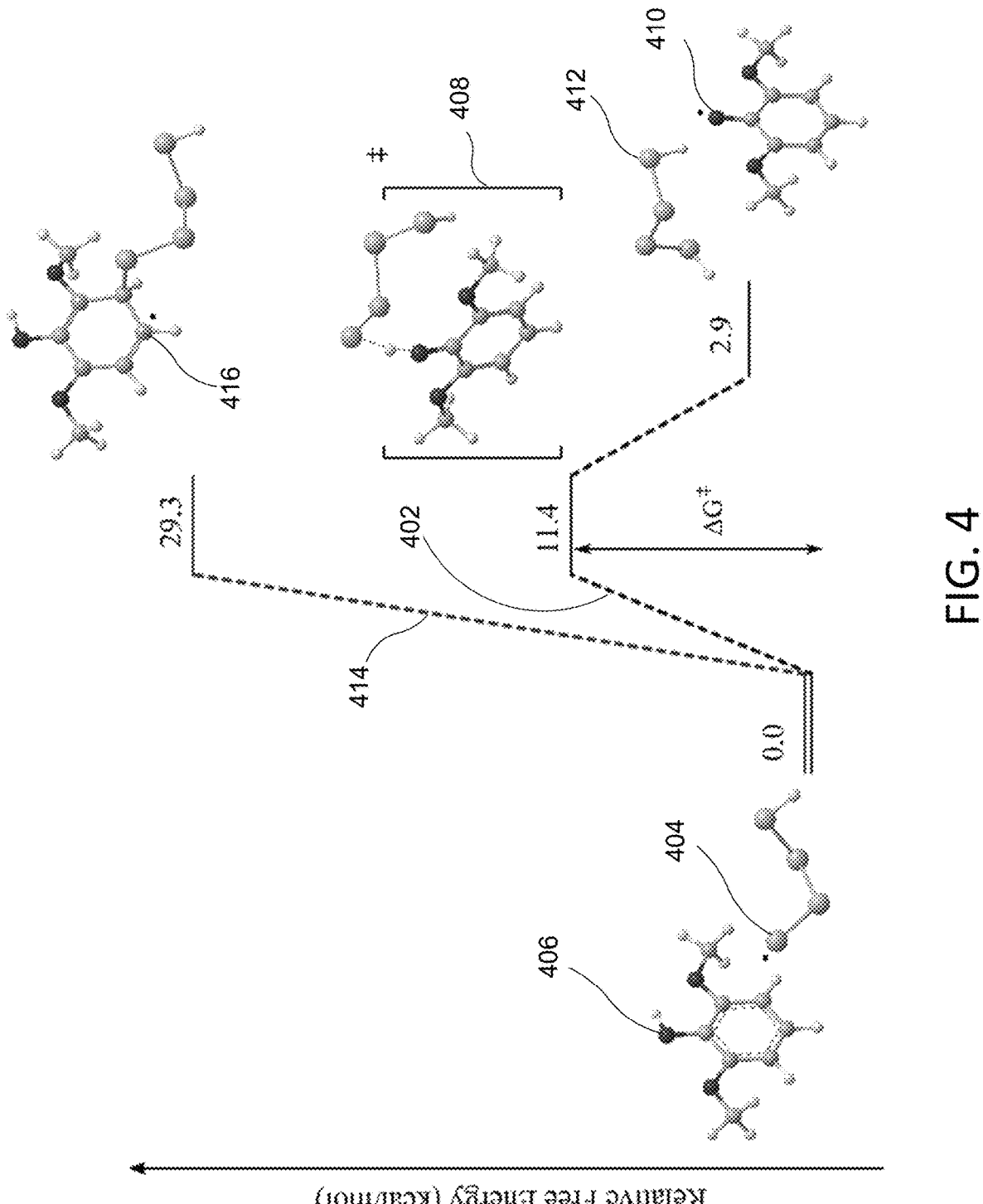
FIG. 4 shows the free energy profile calculated for two proposed mechanisms for the bond formation between sulfur radical S• and hydrogen atom H in a reaction coordinate through which the H—S bond is formed and the O—H bond is cleaved.

To assess the propensity of a phenolic compound to stabilize a polysulfide chain radical through donating a hydrogen atom and producing a more stable phenoxyl radical as depicted by reaction 1 of FIG. 3, the potential-energy surface associated with a single O—H bond rupture in the phenolic compound was analyzed. In FIG. 4, the Gibbs free energy profile is plotted for the bond formation between sulfur radical (S·) and hydrogen (H) in a reaction coordinate through which the H—S bond is formed and the O—H bond is cleaved. This free energy profile results from the energy calculations on the PES points of interest: the minima and maxima corresponding to equilibrium and transition-state structures. As shown in FIG. 4, the pathway 402 for a radical attack of a tetrameric sulfur radical 404 to the 1-WP phenolic O—H 406 proceeds on a potential energy surface with activation barrier $\Delta G\ddagger=11.4$ kcal/mol through transition state 408 to form the phenoxyl radical 410 and non-radical tetrameric sulfur 412 products. The products 410 and 412 are endergonic by 2.9 kcal/mol relative to the isolated reactants 404 and 406. However, this value can be overcome by stabilizing the produced phenoxyl radical with the second polysulfide radical toward a nonradical product. The subsequent reaction between the second tetrameric sulfur radical and phenoxyl radical is highly exergonic (12.1 kcal/mol). Therefore, a thermodynamically unfavorable reaction can be driven by coupling it with a thermodynamically favorable reaction.

To analyze the affinity of a monovalent S-centered radical 404 to add to the double bond of 1-WP phenolic compound 406, the PES was scanned along the —S· . . . ·C— reaction coordinate. The calculated free energy profile for this pathway 414 and the optimized structures of reactants 404 and 406 and product 416 are shown in FIG. 4. The energy results from the relaxed scan show a noticeable ascending trend without a barrier, indicating the interacting system cannot be stabilized in this path. As a consequence, the coordination of a tetrameric sulfur 404 radical to 1-WP 406 is endergonic by 29.3 kcal/mol, suggesting that the attack of a polysulfide radical chain to the cyclic double bond of a phenolic compound does not occur spontaneously.

From the overall DFT energy analysis of the two described mechanisms, the most probable one in terms of free energy is 402, which involves an initial hydrogen abstraction from the phenolic hydroxyl group, resulting in phenoxyl radical formation 410. A possible role for the phenoxyl radical involves a secondary quenching of a polysulfide radical by radical recombination. The mechanism corresponding to pathway 414 involving the formation of a carbon-centered radical adduct 416 from the direct addition of a polysulfide radical chain 404 to a cyclic double bond in a phenolic compound 406 is thermodynamically unfavorable.

Comparison of the Hydrogen-Donating Ability of Phenolic Compounds Using DFT-Based Energy Analysis. To assess the effect of molecular substituents on the hydrogen-donating ability of phenolic compounds, the reactions between several phenolic representatives and a tetrameric sulfur radical are compared with the energy profile 402 obtained for the corresponding mechanism for 1-WP shown in FIG. 4.

Figures 5A, 5B, 5C:
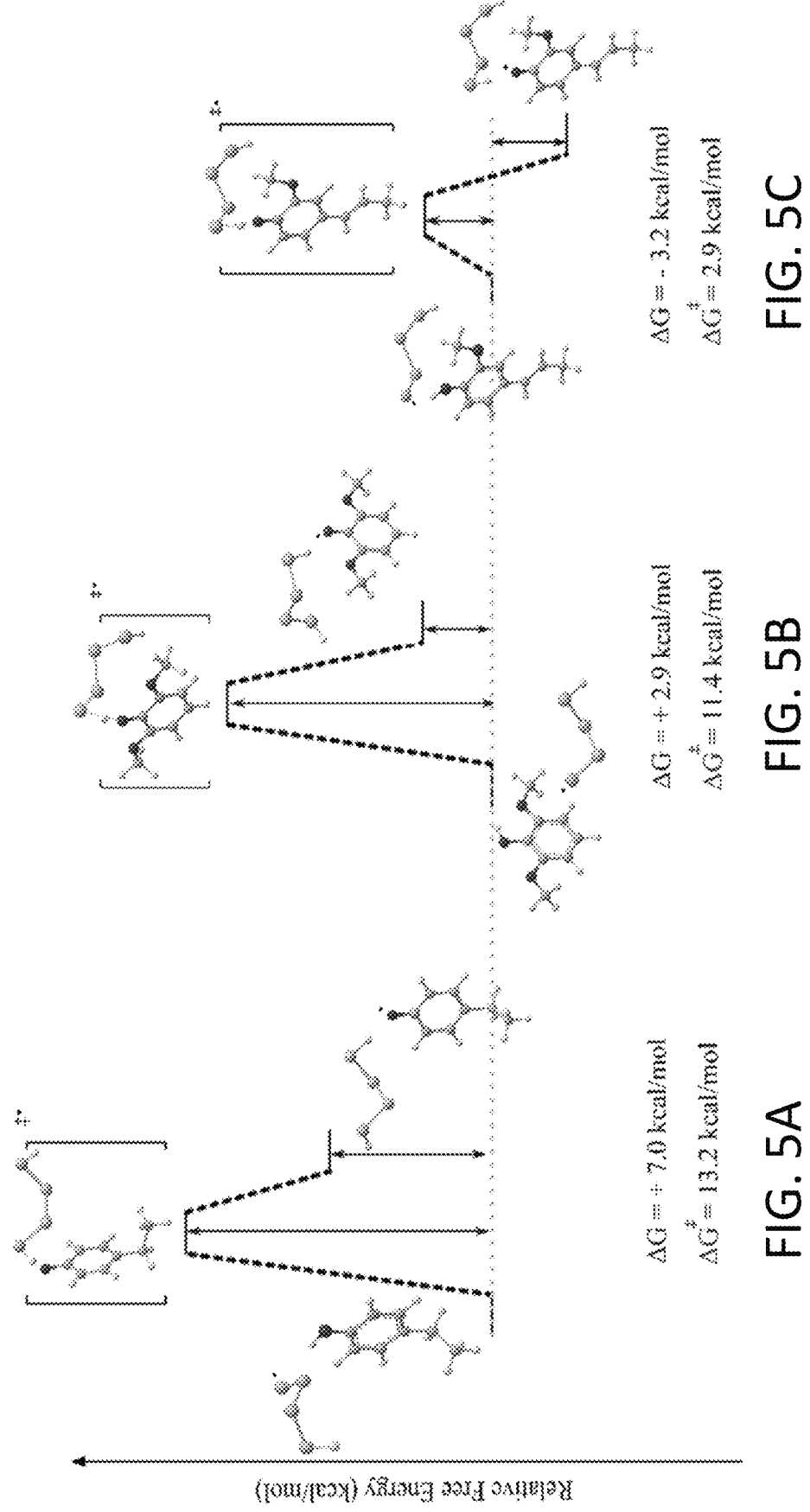
FIGS. 5A-5C show the effect of phenolic substituents on the free energy profile for the hydrogen donating from 1-CS, 1-WP, or 10-WP phenolic compound, respectively, to the tetrameric sulfur radical.

FIGS. 5A-5C show the Gibbs free energy profile for the hydrogen-transfer mechanism for 1-CS, 1-WP, and 10-WP, respectively, analogous to the HAT mechanism for 1-WP shown in FIG. 4, path 402 and reproduced in FIG. 5B. The calculated activation barrier, $\Delta G\ddagger$, for hydrogen abstraction from 10-WP shown in FIG. 5C is lower than that from 1-WP shown in FIG. 5B (2.9 vs. 11.4 kcal/mol). Consequently, the hydrogen donating from 10-WP to stabilize the tetrameric sulfur radical is favored over the hydrogen abstraction from 1-WP by 8.5 kcal/mol. Moreover, the HAT reaction of 10-WP shown in FIG. 5C is exergonic by 3.2 kcal/mol, while the change in the free energy for the hydrogen donation of 1W-P shown in FIG. 5B is positive and the reaction is endergonic by 2.9 kcal/mol. Additionally, 4-WP and 7-WP follow the same trend for the potential-energy surface as 1-WP, leading to the endergonic hydrogen donation to a tetrameric sulfur radical by 3.6 and 2.4 kcal/mol, respectively. The hydrogen transfer was analyzed from the most abundant phenolic compound in corn stover bio-oil and miscanthus bio-oil, 4-ethylphenol (1-CS), to the tetrameric sulfur radical. As shown in FIG. 5A, the 1-CS hydrogen donation leads to a transition state on top of a 13.2 kcal/mol barrier, and the reaction is endergonic by 7.0 kcal/mol. Therefore, the HAT mechanism is not thermodynamically favored for the 1-CS, and thus the ethyl substitution does not increase the effectiveness of the phenoxyl radical to trap more polysulfide radicals.

Differences in the effects of substituents are largely due to the stability of the O—H bond in the phenolic compound and the stability of the phenoxyl radical produced after hydrogen abstraction. Substituents with different electron-withdrawing or electron-donating natures can alter the electron density of the phenolic ring, thereby influencing the abstraction of H• and the occurrence probability of the hydrogen-transfer mechanism. The presence of substituents with a high electron-donating nature in the ortho and para positions of a benzene ring lowers the HAT reaction barrier and leads to a more stable phenoxyl radical as is observed in FIGS. 5A-5C. The O—H bond dissociation enthalpy (BDE) of the phenolic compounds reflects their propensity for hydrogen donation and conversion to phenoxyl radicals, which are more effective radical-scavengers than their parent phenolic compounds. In the following sections, the O—H BDE value is quantified for all phenolic representatives as a numerical descriptor that is associated with the stability of the phenolic O—H bond.

Bond dissociation enthalpy (BDE) is a parameter that can be used to characterize the HAT mechanism. A lower value for BDE corresponds to lower stability of the O—H bond, which indicates that the hydrogen donating of the phenolic compound can more easily occur. To determine the activity of phenolic compounds as radical scavengers in dealing with the polysulfide radicals, BDE values were calculated. BDE can be defined as the enthalpy difference between a phenolic compound and its phenoxyl radical after hydrogen is transferred to an S-centered radical through the gas-phase reaction (Eqs. 3 and 4)

$$\text{ArOH}+\cdot\text{S}—\text{S}—\text{S}—\text{SH} \rightarrow \text{ArO}\cdot+\text{HS}—\text{S}—\text{S}—\text{SH} \tag{3}$$

$$\text{BDE}=\text{H}_{ArO\cdot}+\text{H}_{H\cdot}—\text{H}_{ArOH} \tag{4}$$

where $\text{H}_{ArO\cdot}$, $\text{H}_{H\cdot}$, and $\text{H}_{ArOH}$ are the enthalpy values for a phenoxyl radical, a hydrogen atom, and a phenolic compound, respectively.

The enthalpy value calculated for hydrogen atom in the gas is 312.4 kcal/mol. The calculated O—H BDEs for selected phenolic compounds are shown in Table 3 and plotted in FIG. 6. Trans-isoeugenol and 5-tert-butylpyrogallol (abbreviated 10-WP and 3-WP, respectively) in wood pellet oil have the highest hydrogen-donating ability (the lowest BDE values). 4-ethylphenol (1-CS) has the lowest hydrogen-donating ability (the highest BDE value). These results indicate that even though phenolic compounds share the common phenolic moiety (Ar—O—H), due to structural diversity, these compounds vary significantly in their hydrogen-donating ability.

Figure 6:
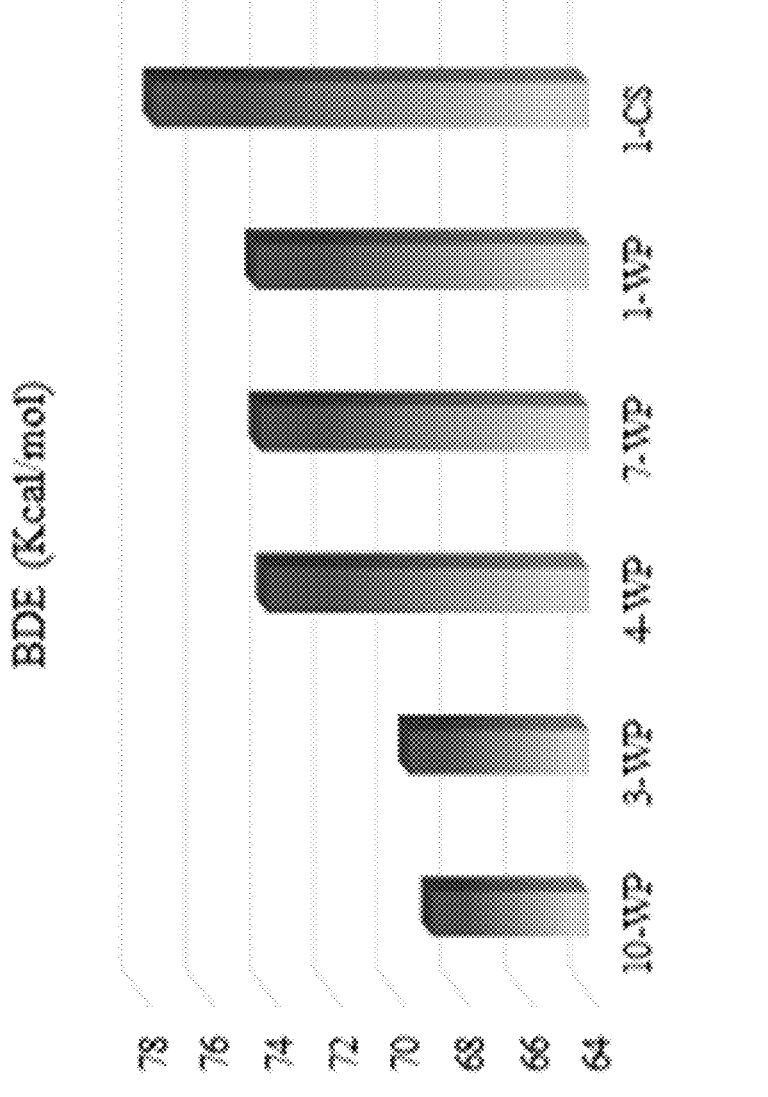
FIG. 6 shows the bond dissociation enthalpy (BDE) values for disclosed phenolic compounds.

Comparing the trend observed for the BDE values shown in FIG. 6 with activation energies ($\Delta G\ddagger$) reported in FIGS. 5A-5C for 1-CS, 1-WP, and 10-WP shows that the molecular substitutions that lead to greater stabilization of the phenoxyl radical weaken the O—H bond in the phenolic parent molecule and thus lower the activation energy for the hydrogen-transfer mechanism. Indeed, there is a correlation between BDE and the activation energy ($\Delta G\ddagger$) for the hydrogen-abstraction reaction. The stability of a phenoxyl radical depends on the electron spin distribution over the radical, which strongly depends on molecular structure. A higher delocalization of an unpaired electron of the phenoxyl reflects its easier formation and higher stability. Thus, spin-density distribution is an important parameter governing two aspects: the stability of a phenoxyl radical after the departure of a hydrogen atom, and the radical-scavenging activity of the phenolic compound.

TABLE 3

The calculated bond dissociation enthalpy, BDE (kcal/mol), for phenolic compounds in gas phase at B3LYP/6-31(d) level.

| Phenolic compounds | Abbreviation | Formula | BDE (kcal/mol) |
|---|---|---|---|
| trans-isoeugenol | 10-WP | $C_{10}H_{12}O_2$ | 68.9 |
| 5-tert-butylpyrogallol | 3-WP | $C_{10}H_{14}O_3$ | 69.6 |
| 2-methoxyphenol | 4-WP | $C_7H_8O_2$ | 74.1 |
| homosyringaldehyde | 7-WP | $C_{10}H_{12}O_4$ | 74.3 |
| 2,6-dimethoxy phenol | 1-WP | $C_8H_{10}O_3$ | 74.4 |
| 4-ethylphenol | 1-CS | $C_8H_{10}O$ | 77.6 |

Figure 7:
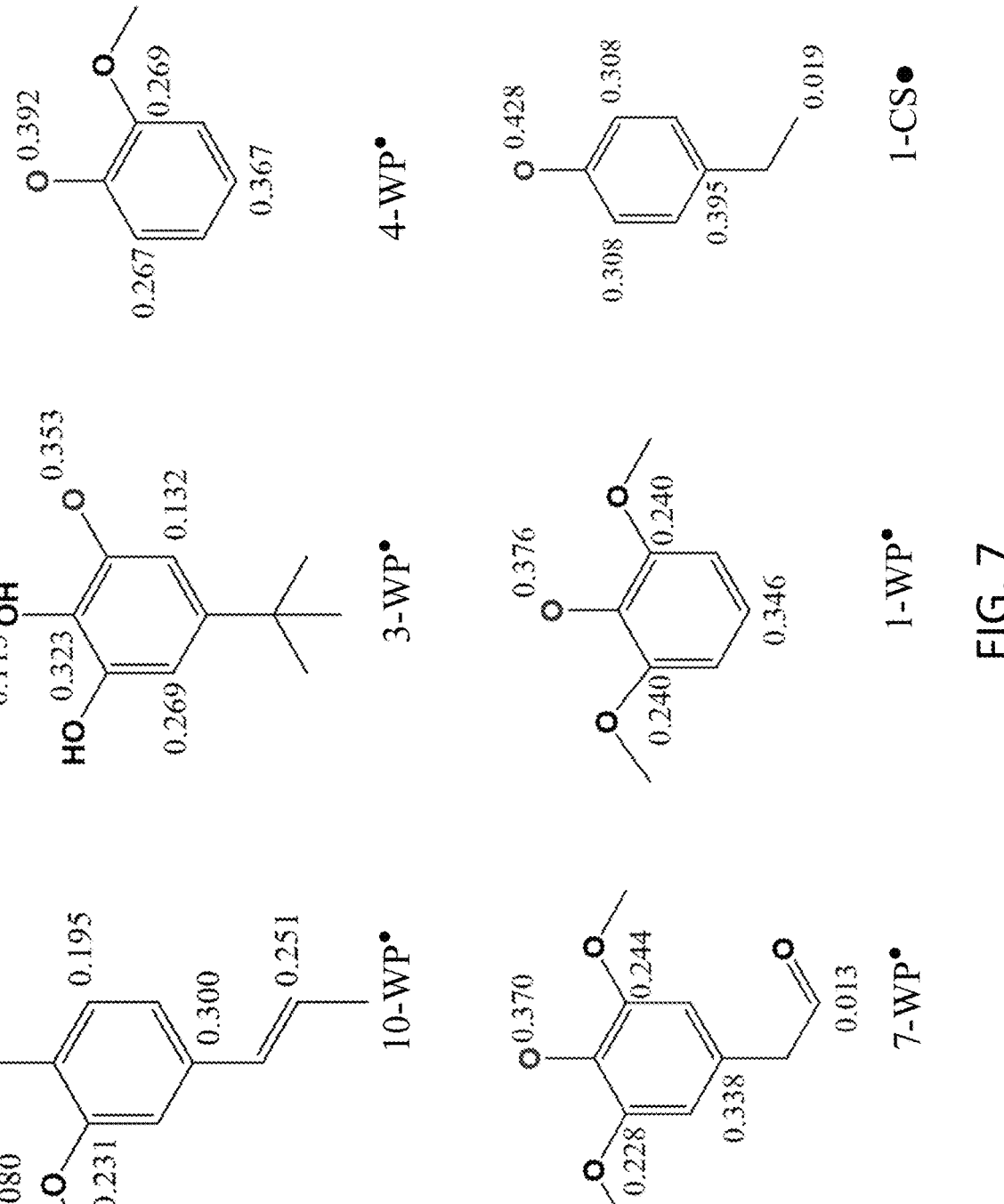
FIG. 7 shows the spin density distribution for phenoxyl radicals of 6 disclosed phenolic compounds calculated by density functional theory at the B3LYP/6-31 (d) level.
Figure 8A:
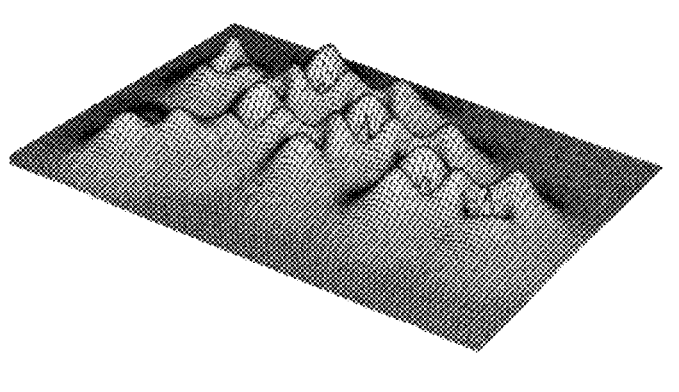
FIGS. 8A-8D show shaded surface maps of electron densities for 10-WP, 10-WP• phenoxyl, 1-WP, and 1-WP• phenoxyl, respectively.
Figure 8B:
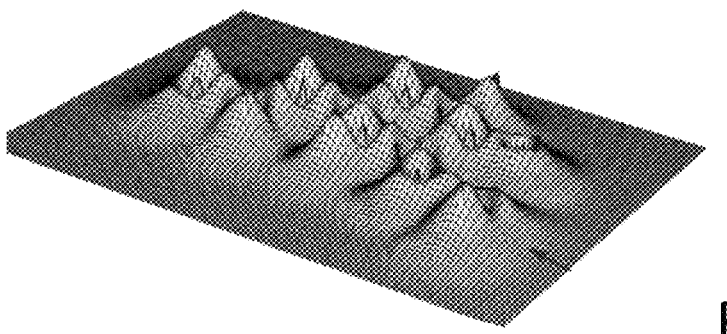
Figure 8C:
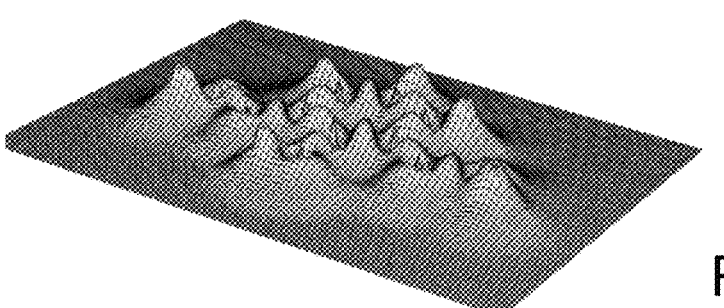
Figure 8D:
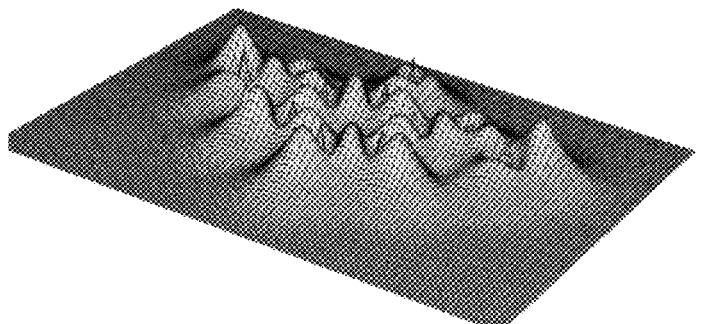

Spin-density analysis of phenoxyl radicals. Spin density can be used in part to explain the stability of a phenoxyl radical and the hydrogen-donating ability of phenolic compounds: a higher spin delocalization generally indicates a more stable radical. In order to assess the effect of the molecular and electronic structure of a phenolic compound on its radical-quenching capacity, the spin-density distributions of the phenoxyl radicals were calculated; the results are shown in FIG. 7. The influence of substituents on the spin-density distribution of phenoxyl radicals is evident, and the degree of spin-density delocalization correlates with the sequence of BDEs. The spin densities of the O atom carrying an unpaired electron for 3-WP• and 10-WP• are 0.353 and 0.347, respectively. There is a greater delocalization of an unpaired electron through the benzene ring and the —CH=CH— for these two phenols, suggesting that the stability of their corresponding phenoxyl radicals is greater than that of the other phenolic representatives with higher spin concentrations on O.

The low spin density of the phenoxyl O atom in 10-WP• is attributed to the simultaneous presence of —O—CH$_3$ and the unsaturated chain substituent, —CH=CH—CH$_3$, which increases the electron delocalization and consequently the 10-WP• stabilization. The decrease in spin density localized on the O in 3-WP• is possibly due to sharing a part of the unpaired electron of the O to form a hydrogen bond with an adjacent OH. The spin-density localization on the adjacent OH shown in FIG. 7 supports this possibility. The spin density for 1-CS• localized on the phenoxyl oxygen is greater, 0.428, due to the lack of substituents that contribute to electron delocalization. This greater spin density localization supports the less favorable H—radical elimination from 1-CS and its high BDE value. Comparing the spin-density distribution in 4-WP•, 7-WP•, and 1-WP• shows that the presence of a second —O—CH$_3$ in the ortho position and a group containing C=O in the para position with respect to the phenolic OH have a slight effect in stabilizing the corresponding phenoxyl radical, as BDE values confirm.

Spin density is delocalized onto the carbon atoms of the benzene ring in the phenolic radical structures, leading to radical stability and providing sites more sensitive to an S-centered free-radical attack. Variations in the electronic and molecular structure of phenolic compounds can influence the capacity of phenol-rich bio-oils to stabilize the polysulfide radicals and prevent their aggregation through quenching the S-centered radicals. The greater spin density distribution in phenoxyl radicals obtained from the most abundant phenolic compounds in WP oil is consistent with a greater polysulfide radical-scavenging capacity of WP phenols compared with phenols in MS and CS oils.

The electron localization function (ELF) and the localized orbital locator (LOL) tools have been used to show electron densities localized as lone pairs and bond pairs. ELF and LOL analysis can obtain qualitative descriptions of electron delocalization and electron-density charge distribution in response to the type of phenolic substitutions. The shaded surface maps of the localized orbital locator in a plain of the phenolic compounds were plotted in FIGS. 8A-8D using Multiwfn software and shown for 10-WP, 10-WP• phenoxyl, 1-WP, and 1-WP• phenoxyl, respectively. These surface maps can reflect the electron density distribution in entire phenolic compounds. The regions with high LOL values are associated with electrons localized as bonds or lone pair, while the regions with small LOL values correspond to delocalized electrons.

FIGS. 8A-8D show the electron distributions in 10-WP and 1-WP and their phenoxyl radicals after hydrogen abstractions, to confirm the effect of substituents on the electronic structure. It can be seen from the LOL isosurfaces that the hydrogen departure helps make the molecular 10-WP skeleton completely planar, which would make it easier for electrons to delocalize in the entire molecular structure. When comparing electron densities of 10-WP and 10-WP• phenoxyl using LOL projection maps (not shown), it can be observed that the electron-density values of C—C covalent bonds are increased in 10-WP•, indicating more electron density is localized around H atoms and in C—C bonds. The electron localization in the methoxy group of 10-WP phenoxyl shows its high contribution to the delocalized unpaired electron of O, while the phenoxyl radical from 1-WP does not show a significant difference in electron distribution compared to the parent molecule. The picture obtained from LOL analysis is in agreement with the spin-density distribution in FIG. 7. This analysis indicates that the unpaired electron delocalization of 10-WP• is effectively higher due to its more extensive conjugation, leading to the stability of the 10-WP• phenoxyl.

Relationship of structure to scavenging activity of phenolic compounds. The electronic effects that influence the stability of a phenolic compound and its corresponding phenoxyl radical include the conjugation effect, the induction effect, and spin delocalization of the unpaired electron. Molecular substituents can stabilize the electron vacancy in the phenoxyl radical formed upon breaking the O—H and thus lower the BDE. Electron-donating substituents can increase the electron density in the benzene ring of a phenolic compound and decrease the O—H dissociation energy, while the electron withdrawing groups make the phenolic O—H more stable and disfavor the hydrogen-transfer mechanism. The formation of an intramolecular hydrogen bond can also compensate for electron deficiency and stabilize a phenoxyl radical. Moreover, delocalization of a phenoxyl's unpaired electron through the aromatic ring is effective to stabilize the radical resulting from hydrogen abstraction and thus decrease the BDE.

Figure 9:
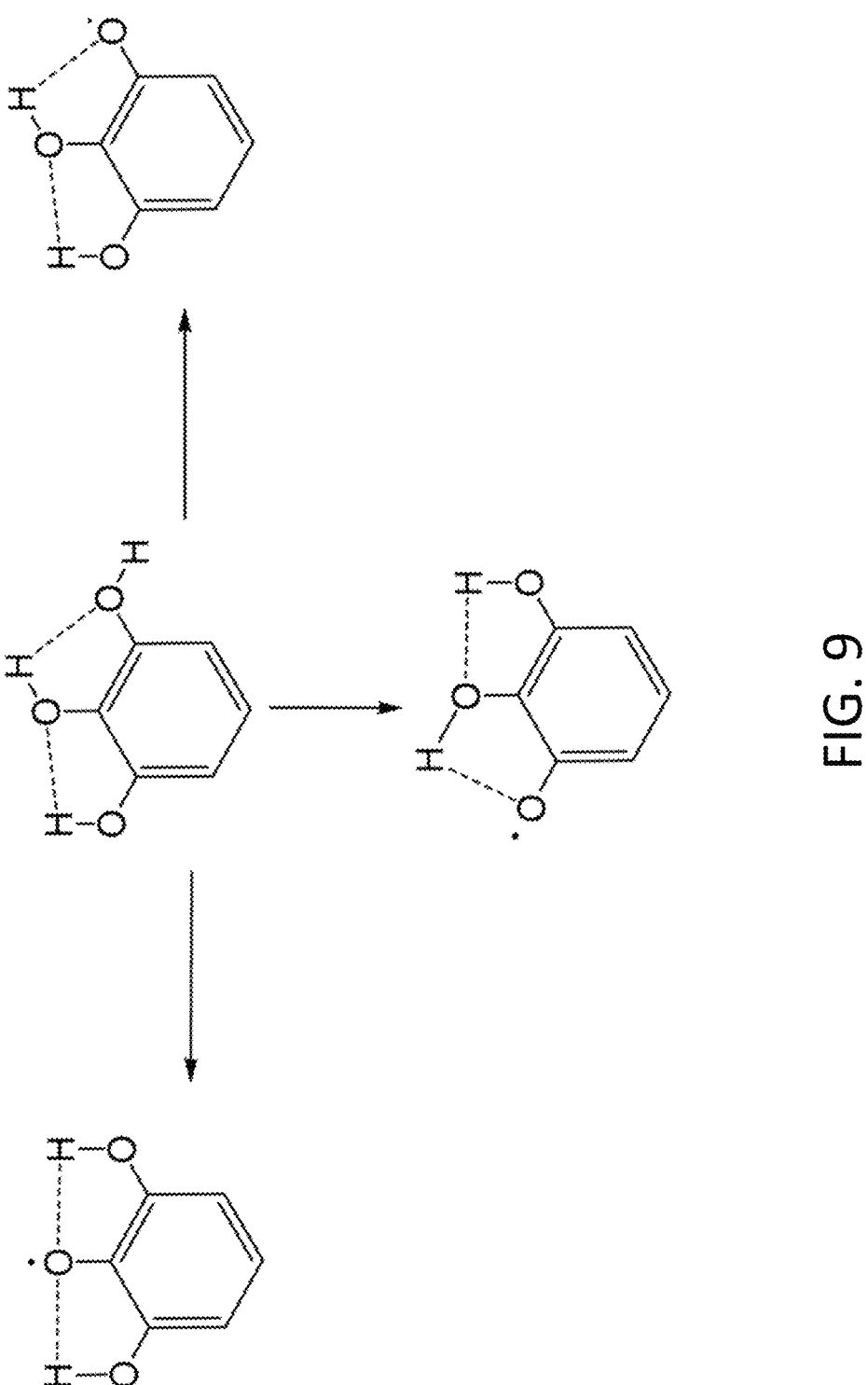
FIG. 9 displays the rotational rearrangements of OH groups to stabilize a phenoxyl radical by intramolecular H-bonding interactions.

Based on the BDE values reported in Table 3, the introduction of the additional hydroxyl group (OH) and methoxy group (OCH$_3$) reduces the O—H BDE of phenolic compounds that corresponds to lower stability of O—H bond and higher radical-scavenging activity. However, the number and substitution positions of methoxy and hydroxyl groups on the benzene ring in a phenolic compound can directly influence the hydrogen donating. Compared with 1-CS, the BDE values of abundant phenolic compounds present in the wood pellet oil (WPs) with more methoxy and hydroxyl groups are lower by about 10 kcal/mol. 1-WP and 3-WP show BDE values of 74.4 kcal/mol and 69.6 kcal/mol, respectively. The lower value of the latter can be due to the fact that a hydroxyl group (O—H) is more effective in comparison with a methoxy group (O—CH$_3$) at enhancing the radical-trapping ability of phenols. The reason can be attributed to the compromise between the electron-donating and electron-withdrawing capabilities of a methoxy group. The presence of electron donor O—H groups in the ortho position of a phenolic hydroxyl is favorable to stabilize the phenoxyl radical arising from hydrogen removal by establishing hydrogen bonds between the vicinal oxygen atoms. FIG. 9 illustrates that rotational rearrangements of OH groups can stabilize a phenoxyl radical by intramolecular H-bonding interactions. The barrier for the hydroxyl rotation in the phenolic compound is very low, so OH rearrangement can happen at room temperature. Therefore, regardless of which OH donates hydrogen to the radical, the product phenoxyl radical can be rearranged to the most stable conformer.

Figures 10A, 10B, 10C, 10D:
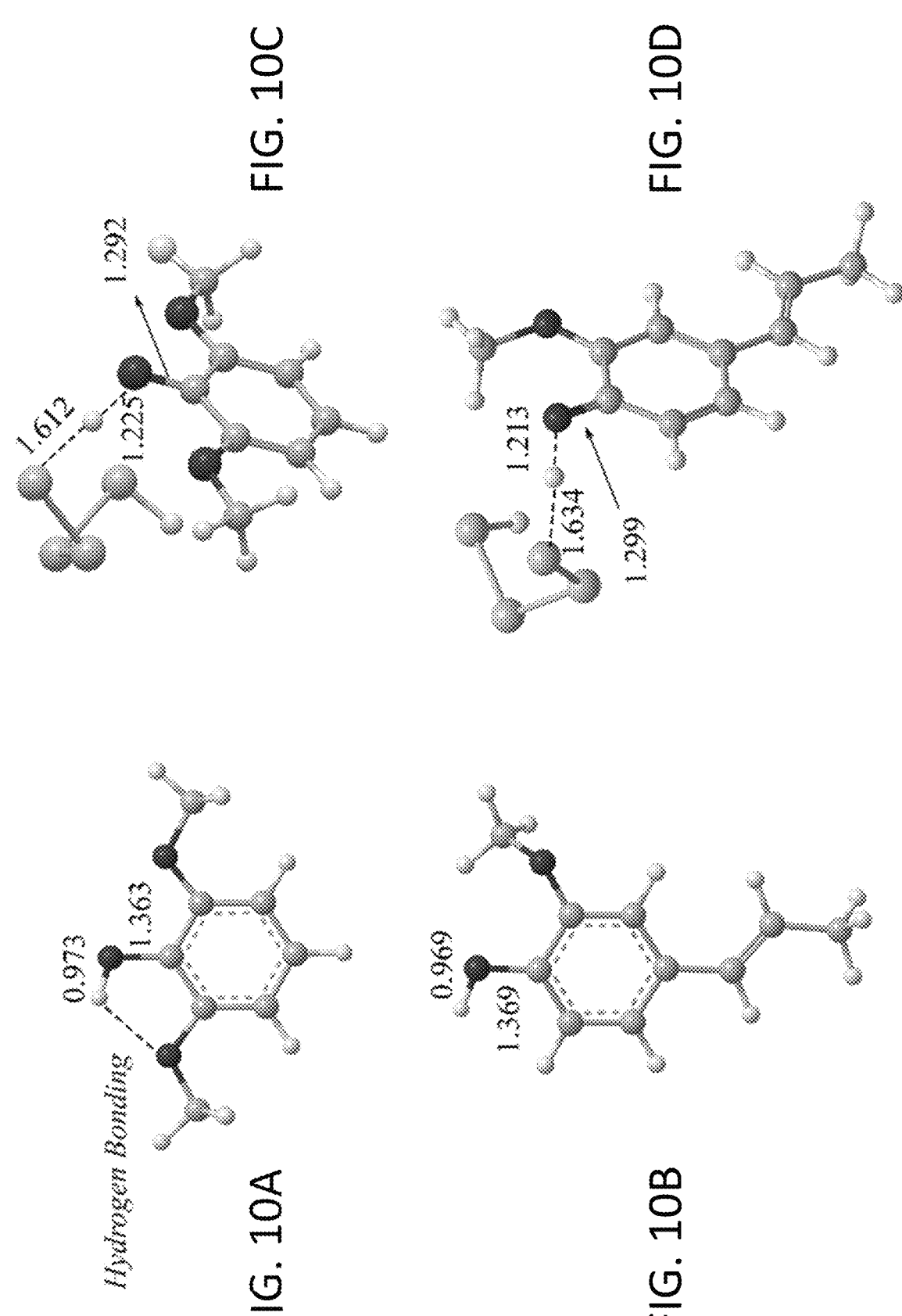
FIGS. 10A and 10B illustrate the ground state structures for 1-WP and 10-WP, respectively.
FIGS. 10C and 10D illustrate the transition state structures for 1-WP and 10-WP, respectively, for hydrogen abstraction by a tetrameric sulfur radical. Bond lengths are given in angstroms.

Ortho methoxy group (O—CH$_3$) also has a hydrogen-bond-accepting nature, so the phenolic hydroxyl (O—H) can be involved in intramolecular hydrogen bonding. Although it remains feasible, the hydrogen abstraction from (poly) methoxy phenols proceeds with a lower rate constant because it is required to pass over a higher energy barrier. This is due at least in part to rupturing the O—H covalent bond and the hydrogen bond simultaneously. FIGS. 10A and 10B show the ground state structures for 1-WP and 10-WP, respectively. FIGS. 10C and 10D show transition state structures for hydrogen abstraction by a tetrameric sulfur radical from 1-WP and 10-WP, respectively. Relevant bond lengths are given in angstroms. Comparing the optimized ground state structures for shown in FIGS. 10A and 10B for 1-WP and 10-WP phenols, respectively, demonstrates that the O—H bond length in 1-WP is longer than that in 10-WP, confirming the intramolecular hydrogen bonding in 1-WP. The O—H group in the 10-WP mono-methoxy phenol shown in FIG. 10B points away from the methoxy substituent and does not participate in intramolecular H-bonding. This electronic difference can justify at least in part the increase in the barrier energy for the hydrogen-transfer mechanism for 1-WP shown in FIG. 5B in comparison with 10-WP shown in FIG. 5C. For the case of 1-WP, the O—H bond is longer and the S . . . H distance is shorter in the transition state shown in FIG. 10C relative to the ground state shown in FIGS. 10A and 5B. The transition state resembles the product, indicating a "late" transition state with the energy close to the product. A late transition state is a characteristic of an endergonic reaction. However, the —CH═CH—CH₃ substituent in 10-WP can be another controlling factor affecting the delocalization of an unpaired electron after hydrogen transfer. For comparison, the unsaturated substituent —CH═CH—CH₃ in the para position of 10-WP reduces the BDE value compared to the corresponding value for 4-WP by about 5.0 kcal/mol, which indicates —CH═CH—CH₃ significantly favors a conjugation and resonance effect on the para oxygen-center radical. The hydrogen-transfer mechanism has a similar probability for phenols with only O—CH₃ groups as electron donating substituents in 4-WP, 7-WP, and 1-WP, with each having a BDE of approximately 74.0 kcal/mol. These approximately equal BDE's are consistent with calculations which yield similar free energy profiles for these three phenols. As demonstrated by DFT-based electronic analysis, the dominant phenolic compounds in the composition of WP oil have higher hydrogen-donating ability to neutralize polysulfide radicals than those in CS and MS oils, so they can produce phenoxyl radicals with radical-scavenging potency to hinder sulfur crystallization and keep polysulfide chains in the bitumen bulk.

Figure 11:
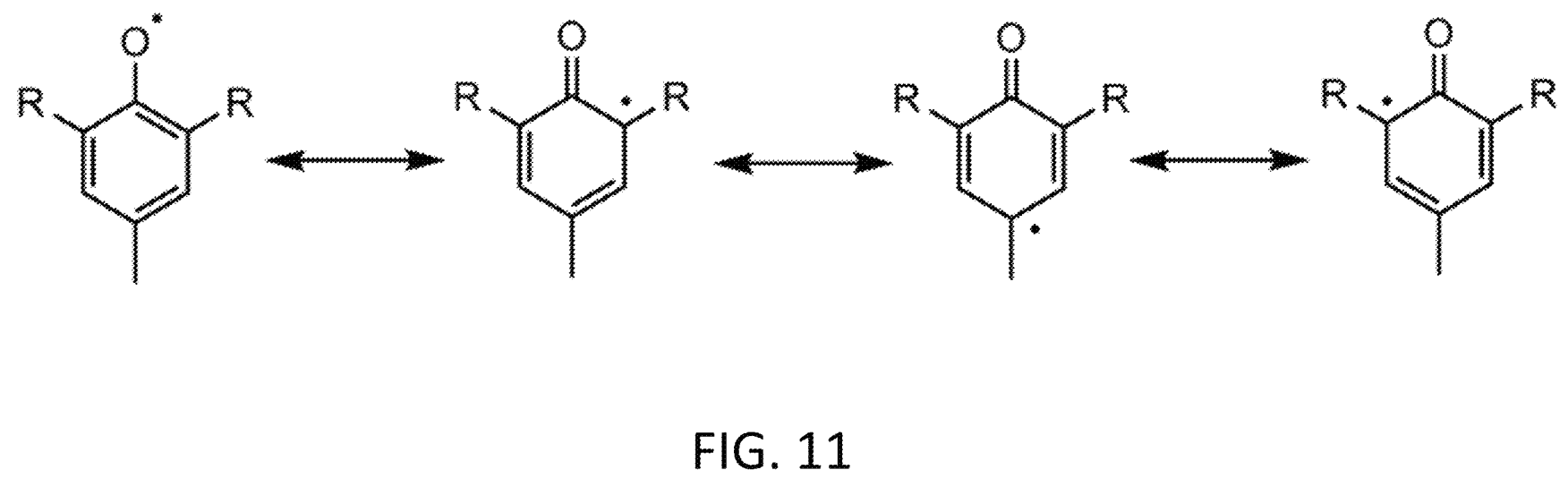

Sulfur-Radical Trapping by Phenoxyl Radicals. A phenoxyl radical can be more reactive toward a sulfur-chain radical due at least in part to the phenoxyl radical's conjugation system facilitating the delocalization of an unpaired electron over the oxygen and carbon atoms as shown in FIG. 11. Phenoxyl radicals can be intermediates in the radical scavenging mechanism of phenols because phenoxyl radicals can react with (quench) free radicals. Considering two free spins in this radical interacting system, two spin states (unrestricted open-shell singlet and unrestricted open-shell triplet) were defined for a tetrameric sulfur radical and a phenoxyl radical, —S• . . . •C—. The spin unrestricted calculations at the UB3LYP/6-31 G(d) level were carried out at each point along the reaction coordinate when a polysulfide radical approaches the phenoxyl radical. In the case of the singlet spin state, the reaction pathway descends in energy and no activation barrier was observed, indicating that this path is energetically favorable. In contrast, the triplet PES exhibits an ascending trend and decreasing energy values. This result indicates that the interacting complex of a polysulfide radical and a phenoxyl radical is not stabilized in the triplet state path. Comparing the potential energy surfaces for unrestricted open-shell singlet and triplet states shows that the reaction path in which the reactants and products are in their singlet states is thermodynamically favorable. Accordingly, the reactivity of phenoxyl radicals to scavenge the polysulfide radicals was compared in the singlet state.

Figures 12A, 12B, 12C:
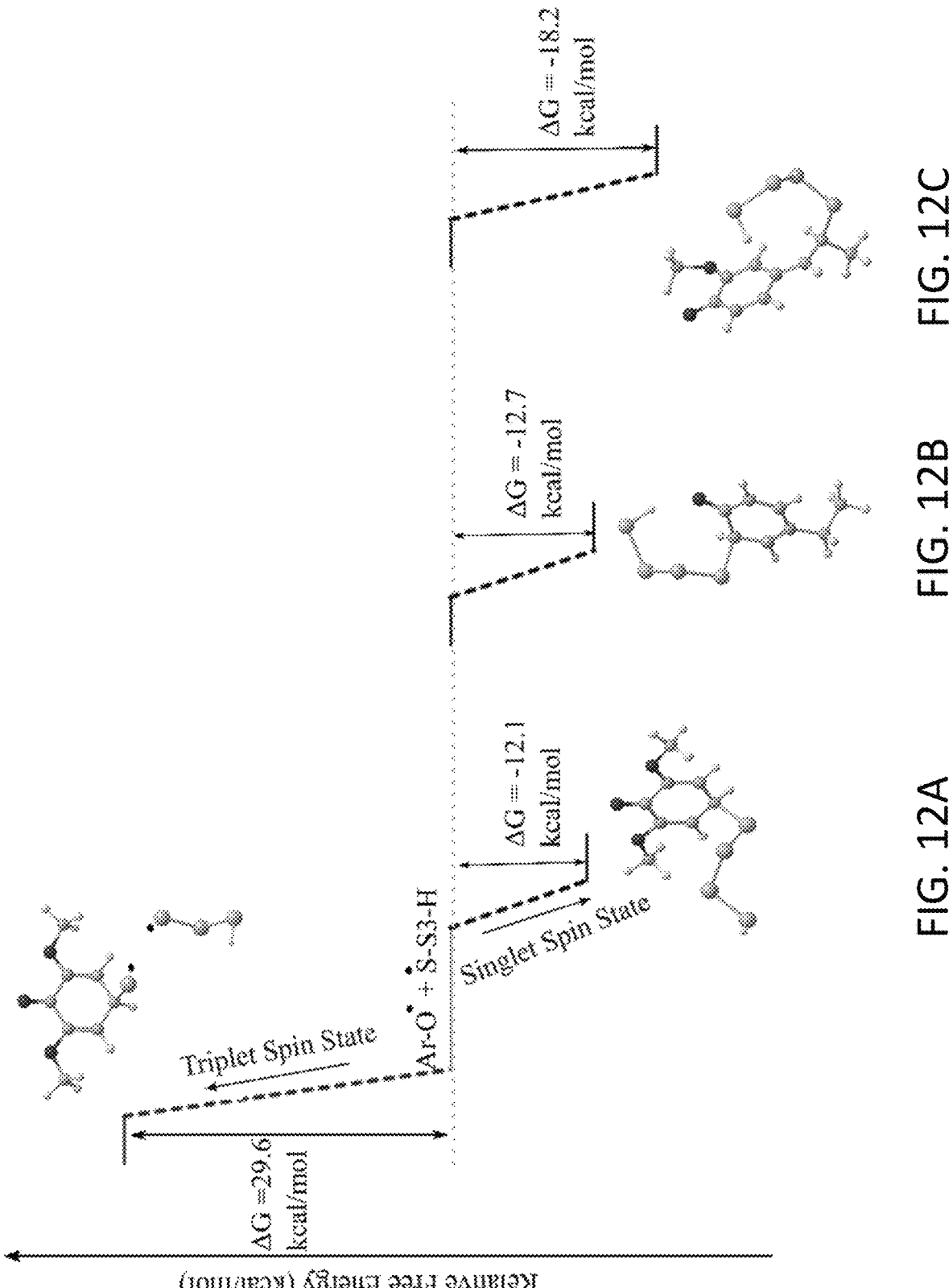
FIG. 12A illustrates the free energy profiles for two potential products from both singlet and triplet spin states relative to the isolated reactants, 1-WP• and tetrameric sulfur radical.
FIG. 12B illustrates the free energy profile for singlet spin state relative to the isolated reactants, 1-CS• and tetrameric sulfur radical.
FIG. 12C illustrates the free energy profile for singlet spin state relative to the isolated reactants, 10-WP• and tetrameric sulfur radical. The horizontal dashed line represents the reactants (Ar—O•+•S—S$_3$—H) free energy level.

The DFT results for the frequency calculations and energy evaluations on minima structures (reactants and products) obtained from the relaxed PES scan are presented in the free energy profile shown in FIGS. 12A-12C. The reaction of a tetrameric sulfur radical with the C—centered radical of the 1-WP phenoxyl through a singlet path shown in FIG. 12A is exergonic by 12.1 kcal/mol and thermodynamically favorable, while the same interaction through the triplet-state mechanism was found to be endergonic by 29.6 kcal/mol. The triplet-state pathway is a spin-forbidden chemical reaction that requires a change in the total spin state from reactants in triplet state to products in singlet state to establish a thermodynamically favorable reaction. Thus, bond formation along the —C . . . . S— reaction coordinate path through which a phenoxyl radical is approaching a tetrameric sulfur radical leads to S—S bond dissociation and the formation of unstable radicals at the top of the PES for the triplet-state mechanism.

The capacity of a phenoxyl radical arising from 10-WP to scavenge monovalent sulfur radicals was analyzed and is shown in FIG. 12C. Results show that the coordination of •S—S₃—H to the 10-WP• through singlet state produces a nonradical product, and polysulfide stabilization is exergonic by 18.2 kcal/mol. It is thus 6.1 kcal/mol more favorable compared to the scavenging polysulfide radical by 1-WP•. These results are consistent with the spin-density distribution analysis shown in FIG. 7; more delocalization in the electronic density in 10-WP• compared to the 1-WP• creates more active sites to scavenge a polysulfide radical. The high concentration of spin density on carbons adjacent to the O carrying unpaired electron density in the 1-CS• phenoxyl radical makes its interaction with a tetrameric sulfur radical thermodynamically feasible: ΔG=−12.7 kcal/mol as shown in FIG. 12B. Because 1-CS is the most abundant phenol present in the CS and MS oil, these properties can explain the increased capacity of oil treated with CS and MS to stabilize sulfur-enhanced bitumen over time compared with oil treated with CO oil or WVO. Moreover, there exists the possibility of polysulfide crosslinking between neighboring phenolic compounds to form R—Sₙ—R species. Although this molecular cross-linked species can impart strength and stiffness to the bitumen mixture, the process competes with the formation of polysulfide radical chains and thus prevents them from switching back to the crystalline state.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A modified bitumen composition comprising:
bitumen;

biomass oil comprising one or more phenolic compounds; and added sulfur, wherein the modified bitumen composition comprises between about 5 wt % and about 25 wt % of the added sulfur, at least some of the added sulfur is present as polysulfide chains, the added sulfur comprises about 70 wt % to about 90 wt % crystalline sulfur, and at least some of the one or more phenolic compounds are configured to covalently bind to the polysulfide chains.

2. The composition of claim 1, wherein the modified bitumen composition comprises between about 10 wt % and about 20 wt % of the added sulfur.

3. The composition of claim 1, wherein the biomass oil comprises plant-based bio-oil.

4. The composition of claim 3, wherein the plant-based bio-oil comprises castor oil, corn stover oil, miscanthus oil, wood pellet oil, vegetable oil, or a combination thereof.

5. The composition of claim 1, wherein the one or more phenolic compounds comprise one or more of 2,6-dimethoxy phenol, 5-tert-butylpyrogallol, homosyringaldehyde, trans-isoeugenol, 4-ethylphenol, 2-methoxy phenol, or a combination thereof.

6. A roadway comprising the modified bitumen of claim 1.

7. A building material comprising the modified bitumen of claim 1.

8. The building material of claim 7, wherein the building material comprises roofing shingles.

9. The building material of claim 8, wherein the roofing shingles demonstrate self-regenerative sulfur blooms during use.

10. The building material of claim 8, wherein the roofing shingles are algae-resistant relative to roofing shingles comprising unmodified bitumen.

11. Roofing shingles comprising the modified bitumen of claim 1.

12. A method of making a modified bitumen, the method comprising:

combining bitumen and elemental sulfur to yield sulfur-extended bitumen; and combining the sulfur-extended bitumen with biomass oil comprising one or more phenolic compounds to yield the modified bitumen, wherein the modified bitumen comprises between about 5 wt % and about 25 wt % of the added sulfur, at least some of the elemental sulfur is present as polysulfide chains, the elemental sulfur comprises about 70 wt % to about 90 wt % crystalline sulfur, and at least some of the one or more phenolic compounds are configured to covalently bind to the polysulfide chains.

13. The method of claim 12, wherein the biomass oil comprises plant-based bio-oil.

14. The method of claim 13, wherein the plant-based bio-oil comprises castor oil, corn stover oil, miscanthus oil, wood pellet oil, vegetable oil, or a combination thereof.

15. The method of claim 12, wherein the modified bitumen comprises between about 10 wt % and about 20 wt % of the elemental sulfur.

16. The method of claim 12, wherein the one or more phenolic compounds comprise one or more of 2,6-dimethoxy phenol, 5-tert-butylpyrogallol, homosyringaldehyde, trans-isoeugenol, 4-ethylphenol, and 2-methoxy phenol.

*    *    *    *    *